US012661948B2

(12) United States Patent
Kim

(10) Patent No.: US 12,661,948 B2
(45) Date of Patent: Jun. 23, 2026

(54) VEHICULAR THERMAL MANAGEMENT SYSTEM

(71) Applicants: HYUNDAI MOTOR COMPANY, Seoul (KR); KIA CORPORATION, Seoul (KR)

(72) Inventor: Ki Hyun Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 139 days.

(21) Appl. No.: 18/489,596

(22) Filed: Oct. 18, 2023

(65) Prior Publication Data

US 2024/0399818 A1      Dec. 5, 2024

(30) Foreign Application Priority Data

May 31, 2023      (KR) ........................ 10-2023-0070282

(51) Int. Cl.
 B60H 1/00           (2006.01)
(52) U.S. Cl.
 CPC ..... B60H 1/00278 (2013.01); B60H 1/00921 (2013.01); B60H 2001/00307 (2013.01); B60H 2001/00928 (2013.01)
(58) Field of Classification Search
 CPC ............ B60H 1/00278; B60H 1/00921; B60H 2001/00307; B60H 2001/00928
 See application file for complete search history.

(56) References Cited

U.S. PATENT DOCUMENTS

| 2020/0180391 | A1* | 6/2020 | Kim .................... | B60H 1/00278 |
| 2023/0052550 | A1* | 2/2023 | Gashi ................ | B60H 1/00385 |
| 2023/0382187 | A1* | 11/2023 | Höfler ................ | B60H 1/00921 |

FOREIGN PATENT DOCUMENTS

WO      WO-2020242096 A1 * 12/2020      ........ B60H 1/00885

* cited by examiner

*Primary Examiner* — Elizabeth J Martin
(74) *Attorney, Agent, or Firm* — Fish & Richardson P.C.

(57)                    ABSTRACT

A vehicular thermal management system includes an HVAC subsystem including a compressor, a heating-side expansion, an exterior heat exchanger, a cooling-side expansion valve, an evaporator, a distribution line allowing at least a portion of a refrigerant discharged from the exterior heat exchanger to be directed from the upstream side of the cooling-side expansion valve to the compressor, and a battery disposed on the distribution line. The system also includes a power electronics cooling subsystem including a power electronic component, a power electronic radiator, a power electronic pump disposed between the power electronic component and the power electronic radiator, and a bypass line allowing at least a portion of a power electronics coolant discharged from the power electronic component to bypass the power electronic radiator; and a heat exchanger including a first passage fluidly connected to the distribution line, and a second passage fluidly connected to the bypass line.

19 Claims, 24 Drawing Sheets

VEHICULAR THERMAL MANAGEMENT SYSTEM

CROSS-REFERENCE TO RELATED APPLICATION

This application is based on and claims the benefit of priority to Korean Patent Application No. 10-2023-0070282, filed on May 31, 2023, in the Korean Intellectual Property Office, the disclosure of which is incorporated herein in its entirety by reference.

TECHNICAL FIELD

The present disclosure relates to a vehicular thermal management system, and more particularly, to a vehicular thermal management system designed to improve performance of a heating, ventilation, and air conditioning (HVAC) subsystem and performance of a power electronics cooling subsystem, and to maintain a temperature of a battery at an optimal operating temperature.

BACKGROUND

With a growing interest in energy efficiency and environmental issues, there is a demand for development of eco-friendly vehicles that can replace internal combustion engine vehicles. Such eco-friendly vehicles are classified into electric vehicles which are driven using fuel cells or electricity as a power source and hybrid vehicles which are driven using an engine and a battery.

Electric vehicles or hybrid vehicles may include a vehicular thermal management system for air conditioning in a passenger compartment and maintaining a battery and/or power electronic components at optimal temperatures. The vehicular thermal management system may include a heating, ventilation, and air conditioning (HVAC) subsystem for air conditioning in the passenger compartment, a power electronics cooling subsystem designed to maintain the power electronic components of a power electronics system at appropriate temperatures, and a battery cooling subsystem designed to maintain the battery at an appropriate temperature.

The battery cooling subsystem may include a battery coolant circulation path through which a battery coolant for cooling the battery circulates, and the battery may have a coolant passage fluidly connected to the battery coolant circulation path. The battery coolant circulating in the battery coolant circulation path may exchange heat with a refrigerant circulating in a refrigerant circulation path through a battery chiller so that the battery coolant may be cooled, and the cooled battery coolant may cool the battery to an appropriate temperature. In addition, a battery temperature-rising heater for increasing the temperature of the battery may be provided. When the heater is turned on, the battery coolant may be heated, and the heated battery coolant may increase the temperature of the battery.

As desired performance of an electric vehicle becomes higher, the density, current, and voltage of battery cells, the level of an autonomous driving controller, and the like may increase. Accordingly, a heat generating amount of the battery and a heat generating amount of the autonomous driving controller may increase, so a cooling load of the battery and a cooling load of the autonomous driving controller may increase.

In some cases, the battery coolant having exchanged heat with the refrigerant is used to cool the battery so that heat loss may occur between the refrigerant and the battery coolant, which relatively reduces the battery cooling performance of the battery coolant.

SUMMARY

The present disclosure has been made to solve the above-mentioned problems occurring in the prior art while advantages achieved by the prior art are maintained intact.

An aspect of the present disclosure provides a vehicular thermal management system designed to improve performance of a heating, ventilation, and air conditioning (HVAC) subsystem and performance of a power electronics cooling subsystem, and to maintain a temperature of a battery at an optimal operating temperature.

According to an aspect of the present disclosure, a vehicular thermal management system comprises: a heating, ventilation, and air conditioning (HVAC) subsystem including a compressor, a heating-side expansion valve disposed at a downstream side of the compressor, an exterior heat exchanger disposed at a downstream side of the heating-side expansion valve, a cooling-side expansion valve disposed at a downstream side of the exterior heat exchanger, an evaporator disposed at a downstream side of the cooling-side expansion valve, a distribution line configured to guide at least a portion of a refrigerant discharged from the exterior heat exchanger in a direction from an upstream side of the cooling-side expansion valve to the compressor, and a battery disposed at the distribution line; a power electronics cooling subsystem comprising a power electronic component, a power electronic radiator, a power electronic pump disposed between the power electronic component and the power electronic radiator, and a bypass line configured to allow at least a portion of a power electronics coolant discharged from the power electronic component to bypass the power electronic radiator; and a heat exchanger comprising (i) a first passage fluidly connected to the distribution line and (ii) a second passage fluidly connected to the bypass line.

Implementations according to this aspect can include one or more of the following features. For example, the first passage of the heat exchanger can be fluidly connected to the distribution line and disposed at a downstream side of the battery.

In some examples, the second passage of the heat exchanger can be fluidly connected to the bypass line and disposed at a downstream side of the power electronic component.

The HVAC subsystem can further comprise a battery-side expansion valve disposed at an upstream side of the battery in the distribution line.

The battery-side expansion valve can comprise (i) an inlet port configured to fluidly communicate with the exterior heat exchanger and (ii) an outlet port configured to fluidly communicate with the battery.

The HVAC subsystem can further comprise an upstream bypass line configured to guide the refrigerant from the upstream side of the battery to a downstream side of the battery.

The battery-side expansion valve can further comprises a bypass port configured to fluidly communicate with the upstream bypass line.

An outlet of the upstream bypass line can be connected to the distribution line at an upstream point of the first passage of the heat exchanger.

The HVAC subsystem can further comprise a warm-up line configured to guide the refrigerant from the downstream side of the compressor to the battery.

The HVAC subsystem can further comprise an interior condenser disposed between the compressor and the heating-side expansion valve.

The HVAC subsystem can further comprise a first control valve configured to allow the refrigerant discharged from the compressor to be directed toward at least one of the interior condenser or the battery.

The HVAC subsystem can further comprise a downstream bypass line configured to guide the refrigerant discharged from the battery to the heating-side expansion valve.

The HVAC subsystem can further comprise a second control valve configured to allow the refrigerant discharged from the battery to be directed toward at least one of the first passage of the heat exchanger or the heating-side expansion valve.

The HVAC subsystem can further comprise a heat exchanger bypass line configured to guide at least a portion of the refrigerant discharged from the heating-side expansion valve in a direction from an upstream side of the exterior heat exchanger to the downstream side of the exterior heat exchanger.

The HVAC subsystem can further comprise a third control valve configured to allow at least a portion of the refrigerant discharged from the heating-side expansion valve to be directed toward at least one of the exterior heat exchanger or the heat exchanger bypass line.

The HVAC subsystem can further comprise a dehumidification bypass line configured to guide at least a portion of the refrigerant discharged from the heating-side expansion valve in a direction from an upstream side of the exterior heat exchanger to the evaporator.

The HVAC subsystem can further comprise a shut-off valve disposed at the dehumidification bypass line.

The HVAC subsystem can further comprise a second distribution line configured to guide the refrigerant discharged from the exterior heat exchanger in a direction from the upstream side of the cooling-side expansion valve to the first passage of the heat exchanger.

The HVAC subsystem can further comprise an autonomous driving controller disposed at the second distribution line.

The power electronics cooling subsystem can further comprise a switching valve configured to allow the power electronics coolant discharged from the power electronic component to be directed toward at least one of the power electronic radiator or the bypass line.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
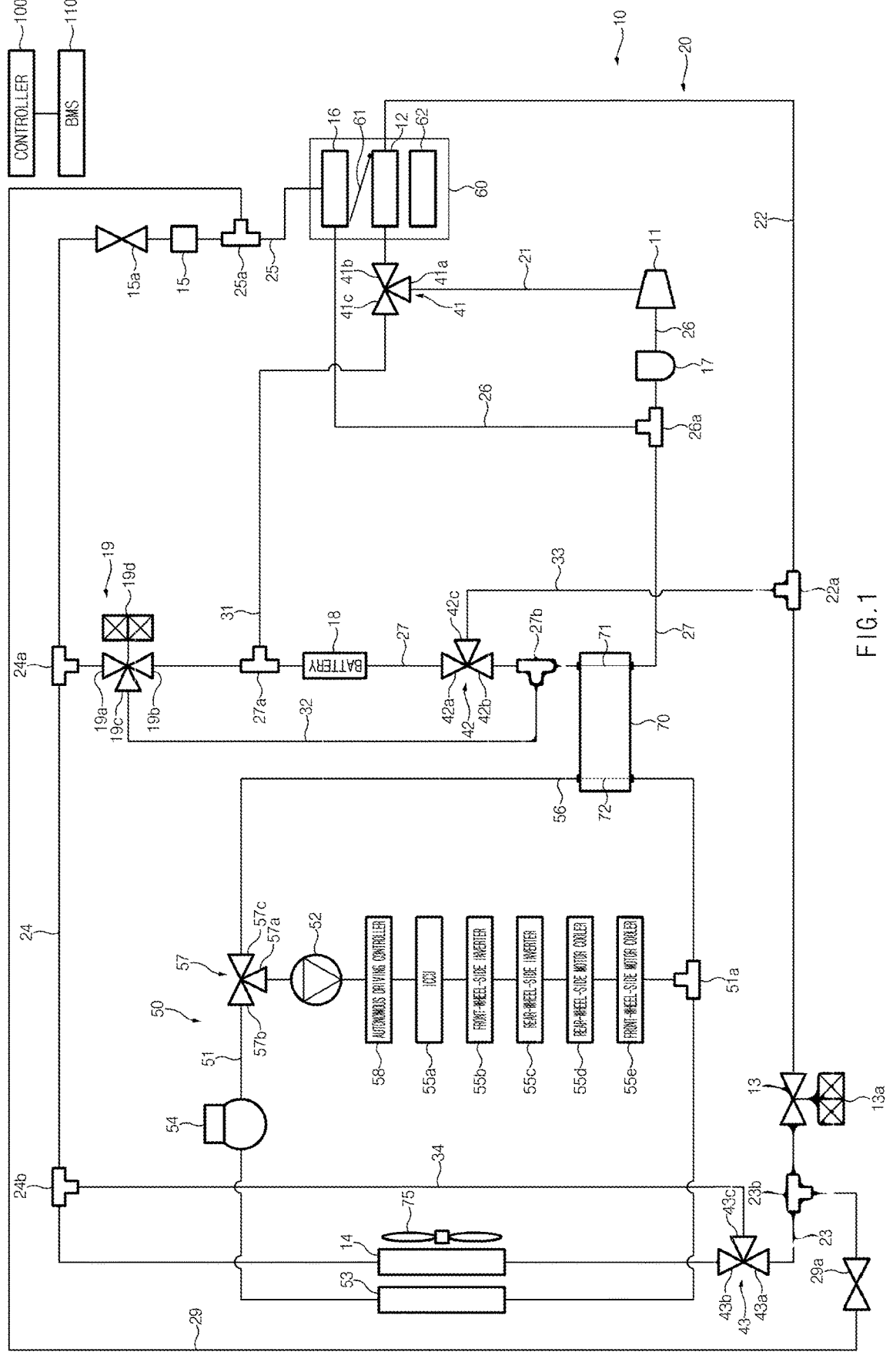
FIG. 1 illustrates an example of a configuration of a vehicular thermal management system.

Hereinafter, one or more implementations of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Referring to FIG. 1, in some implementations, a vehicular thermal management system can include a heating, ventilation, and air conditioning (HVAC) subsystem 10 including a refrigerant circulation path 20 through which a refrigerant circulates, and a power electronics cooling subsystem 50 including a power electronics coolant circulation path 51 through which a power electronics coolant for cooling a plurality of power electronic components 55a, 55b, 55c, 55d, and 55e circulates.

The HVAC subsystem 10 can be thermally connected to a passenger compartment. In particular, the HVAC subsystem 10 can be configured to heat or cool air in the passenger compartment of the vehicle using the refrigerant.

The refrigerant circulation path 20 can be configured to provide various circulation paths based on various operating modes such as operating modes of the HVAC subsystem 10 and cooling and temperature-rising of a battery 18.

The HVAC subsystem 10 can include a compressor 11, an interior condenser 12, a heating-side expansion valve 13, an exterior heat exchanger 14, a cooling-side expansion valve 15, and an evaporator 16 fluidly connected through the refrigerant circulation path 20.

The compressor 11 can be configured to compress the refrigerant and allow the refrigerant to circulate. In some implementations, the compressor 11 can be an electric compressor driven by electric energy.

The interior condenser 12 can be disposed on the downstream side of the compressor 11, and the interior condenser 12 can be configured to condense the refrigerant received from the compressor 11. That is, the refrigerant compressed by the compressor 11 can transfer heat to the air and be condensed in the interior condenser 12. Accordingly, the interior condenser 12 can heat the air using the refrigerant compressed by the compressor 11, and the air heated by the interior condenser 12 can be directed into the passenger compartment.

The heating-side expansion valve 13 can be disposed on the downstream side of the interior condenser 12 in the refrigerant circulation path 20. Specifically, the heating-side expansion valve 13 can be disposed between the interior condenser 12 and the exterior heat exchanger 14. During a heating operation of the HVAC subsystem 10, the heating-side expansion valve 13 can adjust the flow of the refrigerant and/or the flow rate of the refrigerant into the exterior heat exchanger 14. The heating-side expansion valve 13 can be configured to expand the refrigerant received from the interior condenser 12 during the heating operation of the HVAC subsystem 10. The opening degree of the heating-side expansion valve 13 can be varied by a controller 100. As the opening degree of the heating-side expansion valve 13 is varied, the flow rate of the refrigerant into the exterior heat exchanger 14 can be varied. That is, the heating-side expansion valve 13 can be controlled by the controller 100 during the heating operation of the HVAC subsystem 10.

In some implementations, the heating-side expansion valve 13 can be an electronic expansion valve (EXV) having an actuator 13a. The actuator 13a can have a shaft which is movable to open or close an orifice defined in a valve body of the heating-side expansion valve 13, and the position of the shaft can be varied depending on the rotation direction, rotation degree, and the like of the actuator 13a, and accordingly the opening degree of the orifice of the heating-side expansion valve 13 can be varied. The controller 100 can control the operation of the actuator 13a. The heating-side expansion valve 13 can be a full open type EXV. When the HVAC subsystem 10 does not operate in a heating mode, the heating-side expansion valve 13 can be fully opened (the opening degree of the heating-side expansion valve 13 is 100%) so that the refrigerant can pass through the heating-side expansion valve 13, and thus the refrigerant can be prevented from being expanded by the heating-side expansion valve 13.

The exterior heat exchanger 14 can be adjacent to a front grille of the vehicle, and the exterior heat exchanger 14 can be exposed to the outside so that heat can be transferred between the exterior heat exchanger 14 and the ambient air. During a cooling operation of the HVAC subsystem 10, the exterior heat exchanger 14 can be configured to condense the refrigerant received from the interior condenser 12. That is, the refrigerant passing through the exterior heat exchanger 14 can serve as an exterior condenser that condenses the refrigerant by transferring heat to the ambient air during the cooling operation of the HVAC subsystem 10. During the heating operation of the HVAC subsystem 10, the exterior heat exchanger 14 can be configured to evaporate the refrigerant expanded by the heating-side expansion valve 13. That is, the refrigerant passing through the exterior heat exchanger 14 can serve as an exterior evaporator that evaporates the refrigerant by absorbing heat from the ambient air during the heating operation of the HVAC subsystem 10. In particular, the exterior heat exchanger 14 can exchange heat with the ambient air forcibly blown by a cooling fan 75 so that a heat transfer rate between the exterior heat exchanger 14 and the ambient air can be further increased.

The cooling-side expansion valve 15 can be disposed on the downstream side of the exterior heat exchanger 14 in the refrigerant circulation path 20, and the cooling-side expansion valve 15 can be disposed between the exterior heat exchanger 14 and the evaporator 16 in the refrigerant circulation path 20. The cooling-side expansion valve 15 can be disposed on the upstream side of the evaporator 16 so that it can adjust the flow of the refrigerant and/or the flow rate of the refrigerant into the evaporator 16. During the cooling operation of the HVAC subsystem 10, the cooling-side expansion valve 15 can be configured to expand the refrigerant received from the exterior heat exchanger 14.

In some implementations, the cooling-side expansion valve 15 can be a thermal expansion valve (TXV) which senses the temperature and/or pressure of the refrigerant and adjusts the opening degree of the cooling-side expansion valve 15. Specifically, the cooling-side expansion valve 15 can be a TXV having a solenoid valve 15a selectively blocking or unblocking the flow of the refrigerant into an internal passage of the cooling-side expansion valve 15. The solenoid valve 15a can be opened or closed by the controller 100, thereby unblocking or blocking the flow of the refrigerant into the cooling-side expansion valve 15. When the solenoid valve 15a is opened, the refrigerant can be allowed to flow into the cooling-side expansion valve 15, and when the solenoid valve 15a is closed, the refrigerant can be blocked from flowing into the cooling-side expansion valve 15.

In some implementations, the solenoid valve 15a can be mounted in a valve body of the cooling-side expansion valve 15, thereby opening or closing the internal passage of the cooling-side expansion valve 15. In some implementations, the solenoid valve 15a can be disposed on the upstream side of the cooling-side expansion valve 15, thereby selectively opening or closing an inlet of the cooling-side expansion valve 15. When the solenoid valve 15a is closed, the refrigerant can be blocked from flowing into the cooling-side expansion valve 15 and the evaporator 16, and accordingly the cooling operation of the HVAC subsystem 10 may not be performed. When the solenoid valve 15a is opened, the refrigerant can be directed to the cooling-side expansion valve 15 and the evaporator 16. That is, when the solenoid valve 15a of the cooling-side expansion valve 15 is opened to a predetermined degree, the cooling operation of the HVAC subsystem can be performed.

The HVAC subsystem 10 can include an HVAC case 60 including a blower blowing the heated air or cooled air into the passenger compartment. The HVAC case 60 can have an inlet and an outlet, and the HVAC case 60 can be configured to allow the air to be directed into the passenger compartment of the vehicle. The evaporator 16 and the interior condenser 12 can be located in the HVAC case 60. An air mixing door 61 can be disposed between the evaporator 16 and the interior condenser 12, and an electric heater 62 such as a PTC (positive temperature coefficient) heater can be disposed on the downstream side of the interior condenser 12 in an air flow direction.

The evaporator 16 can be configured to evaporate the refrigerant, thereby cooling the air directed toward a front seat area, and the interior condenser 12 can be configured to condense the refrigerant, thereby heating the air directed toward the front seat area. The electric heater 62 can be configured to heat the air directed toward the front seat area using electric energy.

The air mixing door 61 can be disposed between the evaporator 16 and the interior condenser 12. As the position of the air mixing door 61 changes, the flow rate of the air cooled by the evaporator 16 and the flow rate of the air heated by the interior condenser 12 can be mixed at a predetermined ratio. The air cooled by the evaporator 16, the air heated by the interior condenser 12, and the air mixed by the air mixing door 61 in the HVAC case 60 can be directed toward the front seat area of the passenger compartment through an air distributer unit.

The HVAC subsystem 10 can further include an accumulator 17 disposed on the upstream side of the compressor 11. The accumulator 17 can separate a liquid refrigerant from the refrigerant, thereby preventing the liquid refrigerant from flowing into the compressor 11.

The refrigerant circulation path 20 can include a first line 21 extending from an outlet of the compressor 11 to the interior condenser 12 or a first control valve 41, a second line 22 extending from the interior condenser 12 or the first control valve 41 to the heating-side expansion valve 13, a third line 23 extending from the heating-side expansion valve 13 to the exterior heat exchanger 14, a fourth line 24 extending from the exterior heat exchanger 14 to the cooling-side expansion valve 15, a fifth line 25 extending from the cooling-side expansion valve 15 to the evaporator 16, and a sixth line 26 extending from the evaporator 16 to the compressor 11.

The HVAC subsystem 10 can further include a distribution line 27 configured to allow at least a portion of the refrigerant discharged from the exterior heat exchanger 14 to be directed from the upstream side of the cooling-side expansion valve 15 to the compressor 11. The distribution line 27 can be configured to connect an upstream point 24a of the cooling-side expansion valve 15 and an upstream point of the compressor 11. An inlet of the distribution line 27 can be connected to the fourth line 24 of the refrigerant circulation path 20 at the upstream point of the cooling-side expansion valve 15. An outlet of the distribution line 27 can be connected to the refrigerant circulation path 20 at the upstream point of the compressor 11. Specifically, the outlet of the distribution line 27 can be connected to the sixth line 26 of the refrigerant circulation path 20 at an upstream point 26a of the accumulator 17 located on the upstream side of the compressor 11. Accordingly, at least a portion of the refrigerant can be directed to the compressor 11 through the distribution line 27.

The distribution line 27 can be configured to allow at least a portion of the refrigerant discharged from the exterior heat exchanger 14 to be directed toward the compressor 11 by bypassing the cooling-side expansion valve 15 and the evaporator 16. Accordingly, the refrigerant can be distributed to the distribution line 27 and the fifth line 25 at a predetermined ratio.

In some implementations, the HVAC subsystem 10 can include the battery 18 disposed on the distribution line 27. The battery 18 can have a refrigerant passage through which the refrigerant passes, and the refrigerant passage can be provided inside or outside of the battery 18. The refrigerant passage of the battery 18 can be fluidly connected to the distribution line 27. The refrigerant passing through the distribution line 27 can pass through the refrigerant passage of the battery 18.

The HVAC subsystem 10 can further include a warm-up line 31 configured to allow at least a portion of the refrigerant discharged from the compressor 11 to be directed from the downstream side of the compressor 11 to the battery 18. The warm-up line 31 can be configured to connect a downstream point of the compressor 11 and an upstream point of the battery 18. An inlet of the warm-up line 31 can be connected to the first line 21 of the refrigerant circulation path 20 at the downstream point of the compressor 11, and an outlet of the warm-up line 31 can be connected to the distribution line 27 at an upstream point 27a of the battery 18. The refrigerant discharged from the compressor 11 can be in a relatively high temperature and high pressure state.

The high temperature refrigerant can be directed to an inlet of the refrigerant passage of the battery 18 through the warm-up line 31 so that the high temperature refrigerant can directly increase the temperature of the battery 18.

For example, when the ambient temperature is −15° C., the temperature of the refrigerant discharged from the compressor 11 can be 32° C.-43° C., and when the ambient temperature is −5° C., the temperature of the refrigerant discharged from the compressor 11 can be 45° C.-57° C. In some examples, as RPM of the compressor 11 is adjusted, the temperature of the battery 18 can reach a target temperature. When the target temperature of the battery 18 is relatively high, the RPM of the compressor 11 can relatively increase, and when the target temperature of the battery 18 is relatively low, the RPM of the compressor 11 can relatively decrease.

The HVAC subsystem 10 can further include a first control valve 41 disposed at a point to which the inlet of the warm-up line 31 and the first line 21 of the refrigerant circulation path 20 are connected. The first control valve 41 can be configured to control the flow of the refrigerant in a manner that allows the refrigerant discharged from the compressor 11 to selectively be directed toward at least one of the interior condenser 12 or the refrigerant passage of the battery 18.

The first control valve 41 can include an inlet port 41*a* communicating with the outlet of the compressor 11, a first outlet port 41*b* communicating with the interior condenser 12, and a second outlet port 41*c* communicating with the inlet of the warm-up line 31.

In a state in which the first control valve 41 performs a first switching operation to allow the inlet port 41*a* to communicate with the first outlet port 41*b*, the refrigerant discharged from the compressor 11 can be directed to the interior condenser 12.

In a state in which the first control valve 41 performs a second switching operation to allow the inlet port 41*a* to communicate with the first outlet port 41*b* and the second outlet port 41*c* at the same time, the refrigerant discharged from the compressor 11 can be distributed to the interior condenser 12 and the refrigerant passage of the battery 18 at a predetermined ratio. A portion of the refrigerant discharged from the compressor 11 can be directed to the interior condenser 12 through the first outlet port 41*b* of the first control valve 41, and a remaining portion of the refrigerant discharged from the compressor 11 can be directed to the upstream point 27*a* of the battery 18 through the second outlet port 41*c* of the first control valve 41 and the warm-up line 31.

The opening degree of the first outlet port 41*b* and the opening degree of the second outlet port 41*c* can be adjusted relative to each other so that the flow rate of the refrigerant into the interior condenser 12 and the flow rate of the refrigerant into the refrigerant passage of the battery 18 can be determined at a predetermined ratio. In some examples, when the flow rate of the refrigerant into the interior condenser 12 is relatively reduced and the performance (the condensation of the refrigerant) of the interior condenser 12 is lowered, the RPM of the compressor 11 can be relatively increased or the electric heater 62 can be activated to make up for the condensation performance of the interior condenser 12.

In a state in which the first control valve 41 performs a third switching operation to allow the inlet port 41*a* to communicate with the second outlet port 41*c*, the refrigerant discharged from the compressor 11 can be directed toward the upstream point 27*a* of the battery 18, and accordingly the refrigerant can pass through the refrigerant passage of the battery 18.

The HVAC subsystem 10 can further include an upstream bypass line 32 configured to allow at least a portion of the refrigerant passing through the distribution line 27 to be directed from the upstream side of the battery 18 to the downstream side of the battery 18. The upstream bypass line 32 can be configured to connect an upstream point of the battery 18 and a downstream point 27*b* of the battery 18. An inlet of the upstream bypass line 32 can be connected to the distribution line 27 at the upstream point of the battery 18, and an outlet of the upstream bypass line 32 can be connected to the distribution line 27 at the downstream point 27*b* of the battery 18. Accordingly, the refrigerant can bypass the battery 18 through the upstream bypass line 32 so that the refrigerant can be directed to the compressor 11.

The HVAC subsystem 10 can further include a battery-side expansion valve 19 located on the upstream side of the battery 18 in the distribution line 27. The battery-side expansion valve 19 can be configured to adjust the flow of the refrigerant and/or the flow rate of the refrigerant into the refrigerant passage of the battery 18, and to expand the refrigerant received from the exterior heat exchanger 14. In some implementations, the battery-side expansion valve 19 can be an EXV having an actuator 19*d*. The controller 100 can control the operation of the actuator 19*d*.

The battery-side expansion valve 19 can include an inlet port 19*a* communicating with the exterior heat exchanger 14, and an outlet port 19*b* communicating with the refrigerant passage of the battery 18. The battery-side expansion valve 19 can include a valve housing, and a valve member moved by the actuator 19*d* in the valve housing.

The valve member can be configured to open or close the inlet port 19*a* by the actuator 19*d*. When the inlet port 19*a* is opened, the inlet port 19*a* can receive the refrigerant discharged from the exterior heat exchanger 14.

The valve member can be configured to adjust the opening degree of the outlet port 19*b* by the actuator 19*d*. When the temperature of the battery exceeds a threshold temperature (that is, waste heat of the battery is relatively high, so the cooling of the battery is provided), the opening degree of the outlet port 19*b* can be adjusted by the valve member and the actuator 19*d* to correspond to a cooling load of the battery 18 so that the refrigerant can be expanded at the outlet port 19*b*, and the flow rate of the refrigerant into the refrigerant passage of the battery 18 can be adjusted, and accordingly the expanded refrigerant can flow into the refrigerant passage of the battery 18. The refrigerant having flowed into the refrigerant passage of the battery 18 can directly absorb heat from the battery 18 so that the refrigerant can evaporate in the refrigerant passage of the battery 18. Thus, the battery 18 can be directly cooled by the evaporation of the refrigerant. When the cooling of the battery 18 is provided, the opening degree of the outlet port 19*b* can be adjusted so that the outlet port 19*b* can serve as an expansion valve that expands the refrigerant flowing into the refrigerant passage of the battery 18.

In some implementations, the battery-side expansion valve 19 can further include a bypass port 19*c* communicating with the upstream bypass line 32, and the valve member can be configured to adjust the opening degree of the bypass port 19*c* by the actuator 19*d*. When the bypass port 19*c* is opened, the refrigerant discharged from the bypass port 19*c* can be directed to the compressor 11 through the upstream bypass line 32.

The bypass port 19c can be directly connected to the upstream bypass line 32, and the opening degree of the bypass port 19c can be adjusted by the actuator 19d so that the flow rate of the refrigerant into the upstream bypass line 32 can be adjusted. The bypass port 19c can serve as a flow control valve that adjusts the flow rate of the refrigerant bypassing the refrigerant passage of the battery 18.

The opening degree of the outlet port 19b and the opening degree of the bypass port 19c can be adjusted depending on the temperature of the battery, and accordingly the flow rate of the refrigerant into the refrigerant passage of the battery 18 and the flow rate of the refrigerant passing through the upstream bypass line 32 can be adjusted at a predetermined ratio. For example, when the temperature of the battery is lower than or equal to a threshold temperature (that is, the waste heat of the battery is relatively reduced), the opening degree of the outlet port 19b can be relatively reduced, and the opening degree of the bypass port 19c can be relatively increased so that the flow rate of the refrigerant into the refrigerant passage of the battery 18 can be lower than the flow rate of the refrigerant passing through the upstream bypass line 32.

The power electronics cooling subsystem 50 can include the power electronics coolant circulation path 51 through which the power electronics coolant circulates, and the power electronics coolant circulation path 51 can include a power electronic pump 52 allowing the power electronics coolant to circulate. The power electronics cooling subsystem 50 can be configured to cool the power electronic components 55a, 55b, 55c, 55d, and 55e of a power electronics system using the power electronics coolant. Specifically, the power electronics cooling subsystem 50 can include an autonomous driving controller 58, the plurality of power electronic components 55a, 55b, 55c, 55d, and 55e, a power electronic radiator 53, a reservoir 54, and the power electronic pump 52 connected to each other through the power electronics coolant circulation path 51.

The autonomous driving controller 58 can be configured to control an autonomous driving system of the vehicle.

For example, the plurality of power electronic components 55a, 55b, 55c, 55d, and 55e can include an integrated charging control unit (ICCU) 55a, a front-wheel-side inverter 55b, a rear-wheel-side inverter 55c, a rear-wheel-side motor cooler 55d, and a front-wheel-side motor cooler 55e.

The autonomous driving controller 58 and each of the power electronic components 55a, 55b, 55c, 55d, and 55e can have a coolant passage provided inside or outside thereof, and the power electronics coolant can pass through the coolant passage.

The power electronic radiator 53 can be adjacent to the front grille of the vehicle, and the power electronic radiator 53 can be cooled by the ambient air forcibly blown by the cooling fan 75. The exterior heat exchanger 14 and the power electronic radiator 53 can be disposed adjacent to each other on the front side of the vehicle so that the exterior heat exchanger 14 and the power electronic radiator 53 can contact the ambient air and exchange heat with the ambient air. The cooling fan 75 can be located behind the exterior heat exchanger 14 and the power electronic radiator 53. An active air flap can be configured to open or close the front grille of the vehicle. As the active air flap is opened, the ambient air can directly contact the exterior heat exchanger 14 and the power electronic radiator 53 through the front grille of the vehicle so that the exterior heat exchanger 14 and the power electronic radiator 53 can directly exchange heat with the ambient air.

The reservoir 54 can be located between an outlet of the power electronic radiator 53 and an inlet of the power electronic pump 52. The reservoir 54 can be configured to temporarily store and replenish the power electronics coolant so that the circulating flow rate of the power electronics coolant can be constantly maintained.

The power electronic pump 52 can be disposed on the upstream side of the power electronic components 55a, 55b, 55c, 55d, and 55e. The power electronic pump 52 can be configured to allow the power electronics coolant to circulate.

The power electronics cooling subsystem 50 can include a bypass line 56 configured to allow at least a portion of the power electronics coolant discharged from the power electronic components 55a, 55b, 55c, 55d, and 55e to bypass the power electronic radiator 53. The bypass line 56 can connect an upstream point of the power electronic pump 52 and a downstream point of the power electronic components 55a, 55b, 55c, 55d, and 55e. One end of the bypass line 56 can be connected to the power electronics coolant circulation path 51 at the upstream point of the power electronic pump 52, and the other end of the bypass line 56 can be connected to the power electronics coolant circulation path 51 at the downstream point 51a of the power electronic components 55a, 55b, 55c, 55d, and 55e.

The power electronics cooling subsystem 50 can further include a switching valve 57 disposed at one end of the bypass line 56. The switching valve 57 can be configured to adjust the flow of the power electronics coolant between the bypass line 56 and the power electronics coolant circulation path 51. The switching valve 57 can be configured to control the flow of the power electronics coolant in a manner that allows the power electronics coolant discharged from the power electronic components 55a, 55b, 55c, 55d, and 55e to be directed toward at least one of the power electronic radiator 53 or the bypass line 56.

The switching valve 57 can include a first port 57a communicating with the power electronic components 55a, 55b, 55c, 55d, and 55e, a second port 57b communicating with the power electronic radiator 53, and a third port 57c communicating with the bypass line 56.

In a state in which the switching valve 57 performs a first switching operation to allow the first port 57a to communicate with the second port 57b, the power electronics coolant discharged from the power electronic components 55a, 55b, 55c, 55d, and 55e can pass through the power electronic radiator 53.

In a state in which the switching valve 57 performs a second switching operation to allow the first port 57a to communicate with the third port 57c, the power electronics coolant discharged from the power electronic components 55a, 55b, 55c, 55d, and 55e can pass through the bypass line 56.

As described above, the power electronics coolant can selectively pass through the power electronic radiator 53 or the bypass line 56 by the switching operation of the switching valve 57. For example, when the cooling of the autonomous driving controller 58 and the cooling of the power electronic components 55a, 55b, 55c, 55d, and 55e are provided, the switching valve 57 can perform the first switching operation to allow the power electronics coolant to pass through the power electronic radiator 53. To transfer waste heat of the power electronic components 55a, 55b, 55c, 55d, and 55e to the refrigerant, the switching valve 57 can perform the second switching operation to allow the power electronics coolant to pass through the bypass line 56.

The vehicular thermal management system can include a heat exchanger 70 thermally connecting the HVAC subsystem 10 and the power electronics cooling subsystem 50. The heat exchanger 70 can be configured to transfer heat between the refrigerant passing through the distribution line 27 of the HVAC subsystem 10 and the power electronics coolant passing through the bypass line 56 of the power electronics cooling subsystem 50.

The heat exchanger 70 can include a first passage 71 through which the refrigerant passes, and a second passage 72 through which the power electronics coolant passes.

The first passage 71 can be fluidly connected to the distribution line 27 of the HVAC subsystem 10. Specifically, the first passage 71 can be fluidly connected to the distribution line 27 on the downstream side of the battery 18, and the first passage 71 can be located on the upstream side of the compressor 11 in a refrigerant flow direction. The first passage 71 can be located between the battery 18 and the compressor 11, and the outlet of the upstream bypass line 32 can be connected to the distribution line 27 at the downstream point 27b of the battery 18 located on the upstream side of the first passage 71 of the heat exchanger 70. Accordingly, at least a portion of the refrigerant discharged from the battery 18 can be directed to the first passage 71 of the heat exchanger 70 through the distribution line 27 of the refrigerant circulation path 20 and then be directed to the compressor 11.

The second passage 72 can be fluidly connected to the bypass line 56 of the power electronics cooling subsystem 50. Specifically, the second passage 72 can be fluidly connected to the bypass line 56 on the downstream side of the power electronic components 55a, 55b, 55c, 55d, and 55e (the upstream side of the power electronic pump 52). Accordingly, at least a portion of the power electronics coolant can be directed to the second passage 72 of the heat exchanger 70 through the bypass line 56 of the power electronics cooling subsystem 50 and then be directed to the power electronic pump 52.

At least a portion of the refrigerant discharged from the battery 18 can pass through the first passage 71 of the heat exchanger 70, and at least a portion of the power electronics coolant can pass through the second passage 72 of the heat exchanger 70 so that the refrigerant passing through the first passage 71 of the heat exchanger 70 can absorb heat from the power electronics coolant passing through the second passage 72 of the heat exchanger 70 and be evaporated. That is, the refrigerant passing through the first passage 71 can absorb the waste heat of the power electronic components 55a, 55b, 55c, 55d, and 55e.

The HVAC subsystem 10 can further include a downstream bypass line 33 configured to allow at least a portion of the refrigerant discharged from the battery 18 to be directed from the upstream side of the first passage 71 of the heat exchanger 70 to the heating-side expansion valve 13. The downstream bypass line 33 can be configured to connect a downstream point of the battery 18 and an upstream point of the heating-side expansion valve 13. An inlet of the downstream bypass line 33 can be connected to the distribution line 27 at the downstream point of the battery 18, and an outlet of the downstream bypass line 33 can be connected to the second line 22 of the refrigerant circulation path 20 at an upstream point 22a of the heating-side expansion valve 13. As the refrigerant discharged from the refrigerant passage of the battery 18 passes t through the downstream bypass line 33, the refrigerant can bypass the first passage 71 of the heat exchanger 70, and the refrigerant can directly flow from the downstream point of the refrigerant passage of the battery 18 to the heating-side expansion valve 13.

The HVAC subsystem 10 can further include a second control valve 42 disposed at a point to which the inlet of the downstream bypass line 33 and the distribution line 27 are connected. The second control valve 42 can be configured to control the flow of the refrigerant (the flow direction of the refrigerant, the flow rate of the refrigerant, and the like) between the refrigerant passage of the battery 18, the first passage 71 of the heat exchanger 70, and the heating-side expansion valve 13. The second control valve 42 can be located on the upstream side of the downstream point 27b of the battery 18 to which the outlet of the upstream bypass line 32 is connected, and the second control valve 42 can be located on the upstream side of the first passage 71 of the heat exchanger 70. Specifically, the second control valve 42 can be configured to control the flow of the refrigerant in a manner that allows at least a portion of the refrigerant discharged from the refrigerant passage of the battery 18 to selectively be directed toward at least one of the first passage 71 of the heat exchanger 70 or the heating-side expansion valve 13.

The second control valve 42 can include an inlet port 42a communicating with an outlet of the refrigerant passage of the battery 18, a first outlet port 42b communicating with the first passage 71 of the heat exchanger 70, and a second outlet port 42c communicating with the downstream bypass line 33.

In a state in which the second control valve 42 performs a first switching operation to allow the inlet port 42a to communicate with the first outlet port 42b, the refrigerant discharged from the refrigerant passage of the battery 18 can be directed to the first passage 71 of the heat exchanger 70.

In a state in which the second control valve 42 performs a second switching operation to allow the inlet port 42a to communicate with the second outlet port 42c, the refrigerant discharged from the refrigerant passage of the battery 18 can be directed to the heating-side expansion valve 13 through the downstream bypass line 33.

The HVAC subsystem 10 can further include a dehumidification bypass line 29 configured to allow at least a portion of the refrigerant discharged from the heating-side expansion valve 13 to be directed from an upstream point 23b of the exterior heat exchanger 14 to the evaporator 16, and a shut-off valve 29a disposed on the dehumidification bypass line 29. The dehumidification bypass line 29 can be configured to connect the upstream point 23b of the exterior heat exchanger 14 and an upstream point 25a of the evaporator 16. Specifically, an inlet of the dehumidification bypass line 29 can be connected to the third line 23 of the refrigerant circulation path 20 at the upstream point 23b of the exterior heat exchanger 14, and an outlet of the dehumidification bypass line 29 can be connected to the fifth line 25 of the refrigerant circulation path 20 at the point 25a between the cooling-side expansion valve 15 and the evaporator 16. When the shut-off valve 29a is opened, at least a portion of the refrigerant discharged from the heating-side expansion valve 13 can be directed into the evaporator 16 through the dehumidification bypass line 29. When the shut-off valve 29a is closed, the refrigerant discharged from the heating-side expansion valve 13 may not pass through the dehumidification bypass line 29.

The HVAC subsystem 10 can further include a heat exchanger bypass line 34 configured to allow at least a portion of the refrigerant discharged from the heating-side expansion valve 13 to be directed from the upstream side of the exterior heat exchanger 14 to the downstream side of the exterior heat exchanger 14. The heat exchanger bypass line 34 can be configured to connect an upstream point of the exterior heat exchanger 14 and a downstream point 24b of the exterior heat exchanger 14. Specifically, an inlet of the heat exchanger bypass line 34 can be connected to the third line 23 of the refrigerant circulation path 20 at the upstream point of the exterior heat exchanger 14, and an outlet of the heat exchanger bypass line 34 can be connected to the fourth line 24 of the refrigerant circulation path 20 at the downstream point 24b of the exterior heat exchanger 14. At least a portion of the refrigerant discharged from the heating-side expansion valve 13 can be directed from the upstream point of the exterior heat exchanger 14 to the downstream point 24b of the exterior heat exchanger 14 through the heat exchanger bypass line 34 so that at least a portion of the refrigerant discharged from the heating-side expansion valve 13 can bypass the exterior heat exchanger 14.

The HVAC subsystem 10 can further include a third control valve 43 disposed at a point to which the refrigerant circulation path 20 and the heat exchanger bypass line 34 are connected. The third control valve 43 can be configured to control the flow of the refrigerant (the flow direction of the refrigerant, the flow rate of the refrigerant, and the like) between the heating-side expansion valve 13, the exterior heat exchanger 14, and the heat exchanger bypass line 34. The third control valve 43 can be configured to control the flow of the refrigerant in a manner that allows at least a portion of the refrigerant discharged from the heating-side expansion valve 13 to selectively be directed toward at least one of the exterior heat exchanger 14 or the heat exchanger bypass line 34.

The third control valve 43 can include an inlet port 43a communicating with the heating-side expansion valve 13, a first outlet port 43b communicating with the exterior heat exchanger 14, and a second outlet port 43c communicating with the heat exchanger bypass line 34.

In a state in which the third control valve 43 performs a first switching operation to allow the inlet port 43a to communicate with the first outlet port 43b, the refrigerant discharged from the heating-side expansion valve 13 can be directed to the exterior heat exchanger 14.

In a state in which the third control valve 43 performs a second switching operation to allow the inlet port 43a to communicate with the second outlet port 43c, the refrigerant discharged from the heating-side expansion valve 13 can bypass the exterior heat exchanger 14 through the heat exchanger bypass line 34.

As described above, the refrigerant can selectively pass through the exterior heat exchanger 14 or the heat exchanger bypass line 34 by the switching operation of the third control valve 43. For example, in a condition in which icing occurs on an exterior surface (heat exchange surface) of the exterior heat exchanger 14, the third control valve 43 can perform the second switching operation to allow the refrigerant to pass through the heat exchanger bypass line 34. In a condition in which icing does not occur on the exterior surface (heat exchange surface) of the exterior heat exchanger 14, the third control valve 43 can perform the first switching operation to allow the refrigerant to pass through the exterior heat exchanger 14.

The controller 100 can be configured to control respective operations of the compressor 11, the actuator 13a of the heating-side expansion valve 13, the solenoid valve 15a of the cooling-side expansion valve 15, the actuator 19d of the battery-side expansion valve 19, the air mixing door 61, an actuator of the first control valve 41, an actuator of the second control valve 42, an actuator of the third control valve 43, an actuator of the air mixing door 61, an actuator of the switching valve 57, and an actuator of the power electronic pump 52. Thus, the overall operation of the HVAC subsystem 10 and the power electronics cooling subsystem 50 can be controlled by the controller 100. In some implementations, the controller 100 can be a full automatic temperature control (FATC) system.

The controller 100 can include a processor and a memory (e.g., a non-transitory memory). The processor can be programmed to receive instructions stored in the memory, and transmit instructions to various actuators. The memory can be a data store such as a hard disk drive, a solid state drive, a server, a volatile storage medium, and a non-volatile storage medium.

A battery management system 110 can transmit instructions for the cooling of the battery 18 and the temperature-rising of the battery 18 to the controller 100, and accordingly the controller 100 can control the operation of the compressor 11 and the operation of the actuator 19d of battery-side expansion valve 19.

Figure 2:
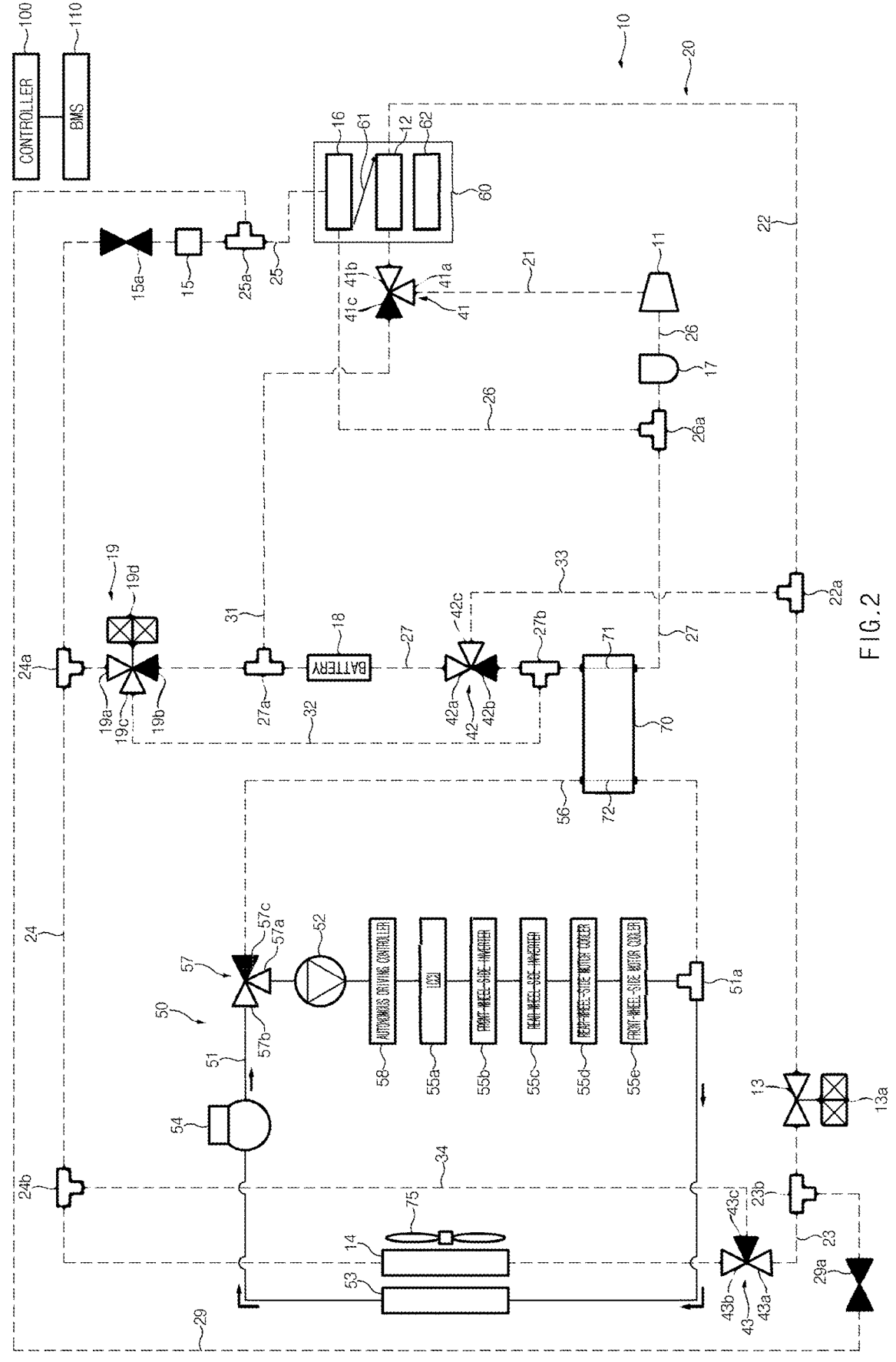
FIG. 2 illustrates an example of the flow of a power electronics coolant when a heating, ventilation, and air conditioning (HVAC) subsystem does not operate, and power electronic components and an autonomous driving controller are cooled by a power electronic radiator in a vehicular thermal management system.

FIG. 2 illustrates the flow of the power electronics coolant when the HVAC subsystem 10 does not operate, and the power electronic components 55a, 55b, 55c, 55d, and 55e and the autonomous driving controller 58 are cooled by the power electronic radiator 53.

In a state in which the compressor 11 of the HVAC subsystem 10 is stopped, and the switching valve 57 performs the first switching operation to allow the first port 57a to communicate with the second port 57b, the power electronics coolant discharged from the outlet of the power electronic pump 52 can pass through the power electronic radiator 53 so that the power electronics coolant can release heat to the ambient air through the power electronic radiator 53, and the power electronics coolant cooled by the ambient air can cool the power electronic components 55a, 55b, 55c, 55d, and 55e and the autonomous driving controller 58.

Figure 3:
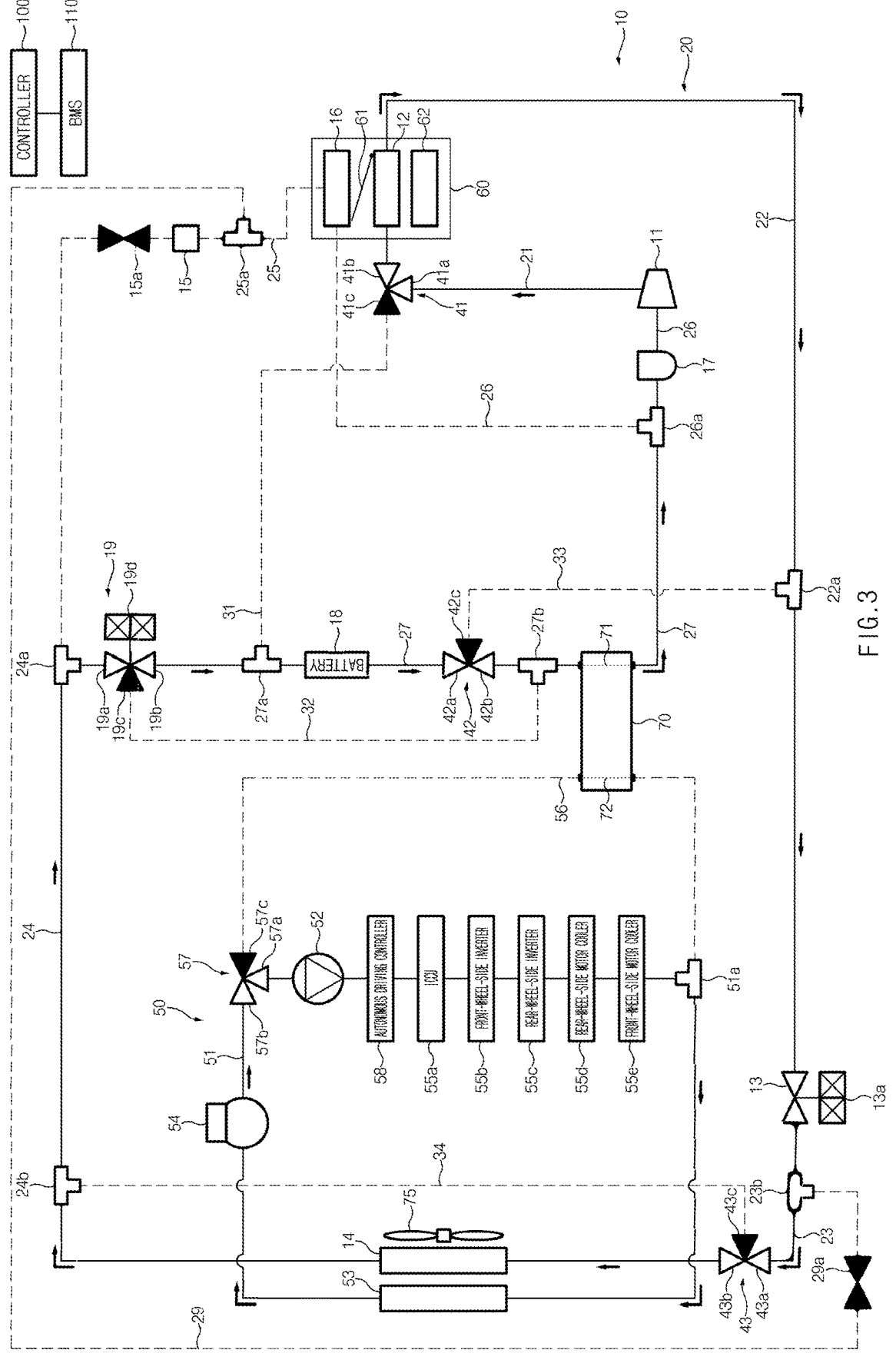
FIG. 3 illustrates an example of the flow of a refrigerant and the flow of a power electronics coolant when a battery is directly cooled by the refrigerant, and power electronic components and an autonomous driving controller are cooled by a power electronic radiator in a vehicular thermal management system.

FIG. 3 illustrates the flow of the refrigerant and the flow of the power electronics coolant when the battery 18 is directly cooed by the refrigerant, and the power electronic components 55a, 55b, 55c, 55d, and 55e and the autonomous driving controller 58 are cooled by the power electronic radiator 53.

In a state in which the solenoid valve 15a of the cooling-side expansion valve 15 is closed, the inlet port 19a of the battery-side expansion valve 19 is opened, the outlet port 19b of the battery-side expansion valve 19 is opened to a predetermined degree, the bypass port 19c of the battery-side expansion valve 19 is closed, the first control valve 41 performs the first switching operation to allow the inlet port 41a to communicate with the first outlet port 41b, the second control valve 42 performs the first switching operation to allow the inlet port 42a to communicate with the first outlet port 42b, and the third control valve 43 performs the first switching operation to allow the inlet port 43a to communicate with the first outlet port 43b, the refrigerant can sequentially pass through the compressor 11, the interior condenser 12, the heating-side expansion valve 13, the exterior heat exchanger 14, the battery-side expansion valve 19, the battery 18, the first passage 71 of the heat exchanger 70, and the accumulator 17.

The heating-side expansion valve 13 can be opened to a predetermined degree so that the refrigerant discharged from the interior condenser 12 can be primarily expanded, and the primarily expanded refrigerant can be primarily evaporated in the exterior heat exchanger 14. The refrigerant discharged from the exterior heat exchanger 14 can be directed to the refrigerant passage of the battery 18 through the battery-side expansion valve 19. The opening degree of the outlet port 19b of the battery-side expansion valve 19 can be adjusted by the actuator 19d to correspond to the cooling load of the battery 18, and accordingly the refrigerant can be secondarily expanded at the outlet port 19b, and the secondarily expanded refrigerant can be directed to the refrigerant passage of the battery 18. The refrigerant directed into the refrigerant passage of the battery 18 can directly absorb heat from the battery 18 so that the refrigerant can be secondarily evaporated in the refrigerant passage of the battery 18, and accordingly the battery 18 can be directly cooled by the evaporation of the refrigerant.

In a state in which the switching valve 57 performs the first switching operation to allow the first port 57a to communicate with the second port 57b, the power electronics coolant discharged from the power electronic components 55a, 55b, 55c, 55d, and 55e can pass through the power electronic radiator 53 so that the power electronics coolant can release heat to the ambient air through the power electronic radiator 53 and be cooled. The power electronics coolant cooled by the ambient air can cool the power electronic components 55a, 55b, 55c, 55d, and 55e and the autonomous driving controller 58.

Figure 4:
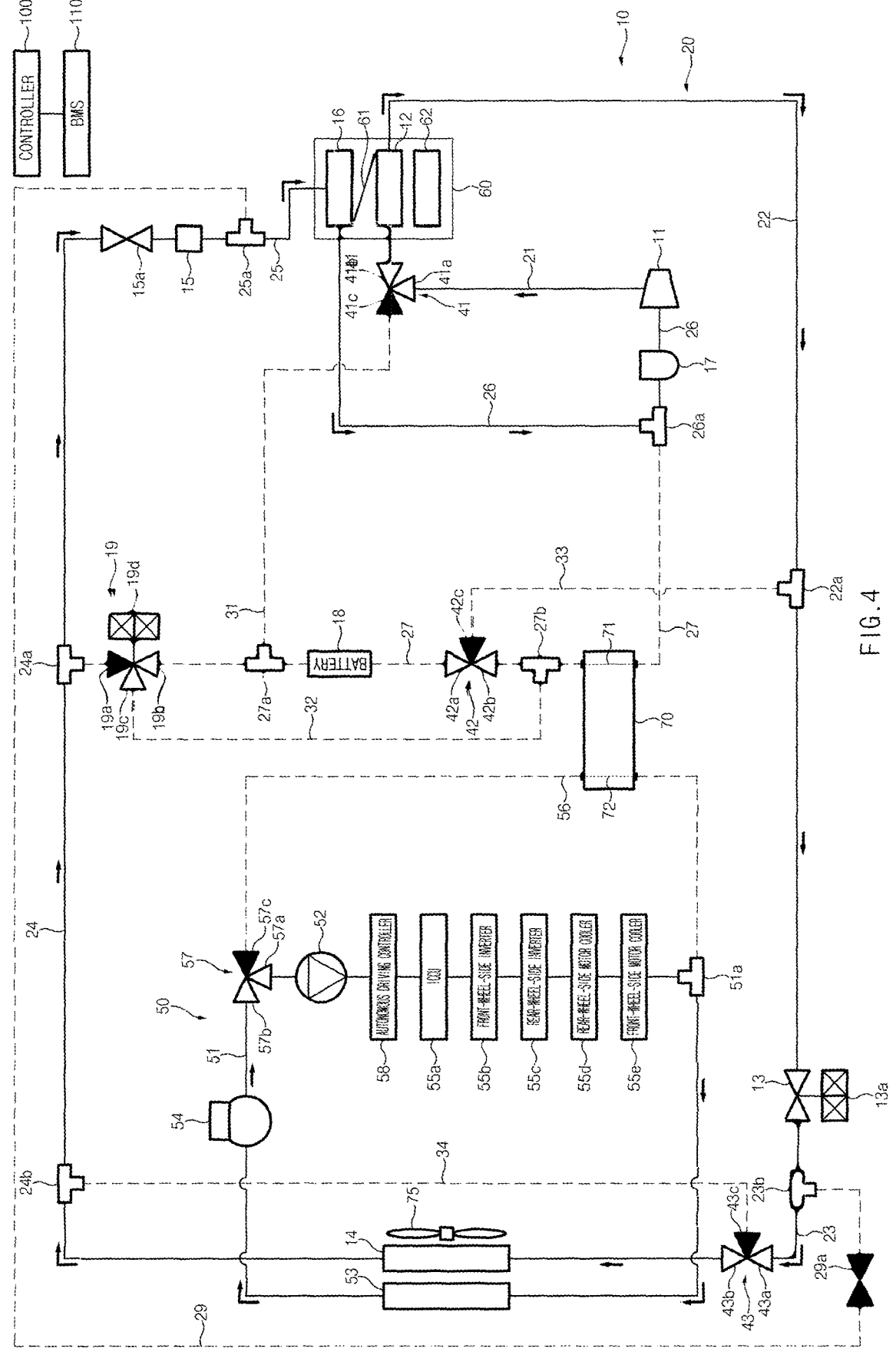
FIG. 4 illustrates an example of the flow of a refrigerant and the flow of a power electronics coolant when an HVAC subsystem operates in a cooling mode, and power electronic components and an autonomous driving controller are cooled by a power electronic radiator in a vehicular thermal management system.

FIG. 4 illustrates the flow of the refrigerant and the flow of the power electronics coolant when the HVAC subsystem 10 operates in the cooling mode, and the power electronic components 55a, 55b, 55c, 55d, and 55e and the autonomous driving controller 58 are cooled by the power electronic radiator 53.

In a state in which the inlet port 19a of the battery-side expansion valve 19 is closed, the solenoid valve 15a of the cooling-side expansion valve 15 is opened, the first control valve 41 performs the first switching operation to allow the inlet port 41a to communicate with the first outlet port 41b, and the third control valve 43 performs the first switching operation to allow the inlet port 43a to communicate with the first outlet port 43b, the refrigerant can sequentially pass through the compressor 11, the interior condenser 12, the heating-side expansion valve 13, the exterior heat exchanger 14, the cooling-side expansion valve 15, the evaporator 16, and the accumulator 17. Here, the heating-side expansion valve 13 can be fully opened (the opening degree of the heating-side expansion valve 13 is 100%) so that the refrigerant can pass through the heating-side expansion valve 13, and thus the refrigerant can be prevented from being expanded by the heating-side expansion valve 13. The opening degree of the cooling-side expansion valve 15 can be adjusted so that the refrigerant can be appropriately expanded by the cooling-side expansion valve 15 and then be directed to the evaporator 16.

In a state in which the switching valve 57 performs the first switching operation to allow the first port 57a to communicate with the second port 57b, the power electronics coolant discharged from the outlet of the power electronic pump 52 can pass through the power electronic radiator 53 so that the power electronics coolant can release heat to the ambient air through the power electronic radiator 53 and be cooled. The power electronics coolant cooled by the ambient air can cool the power electronic components 55a, 55b, 55c, 55d, and 55e and the autonomous driving controller 58.

Figure 5:
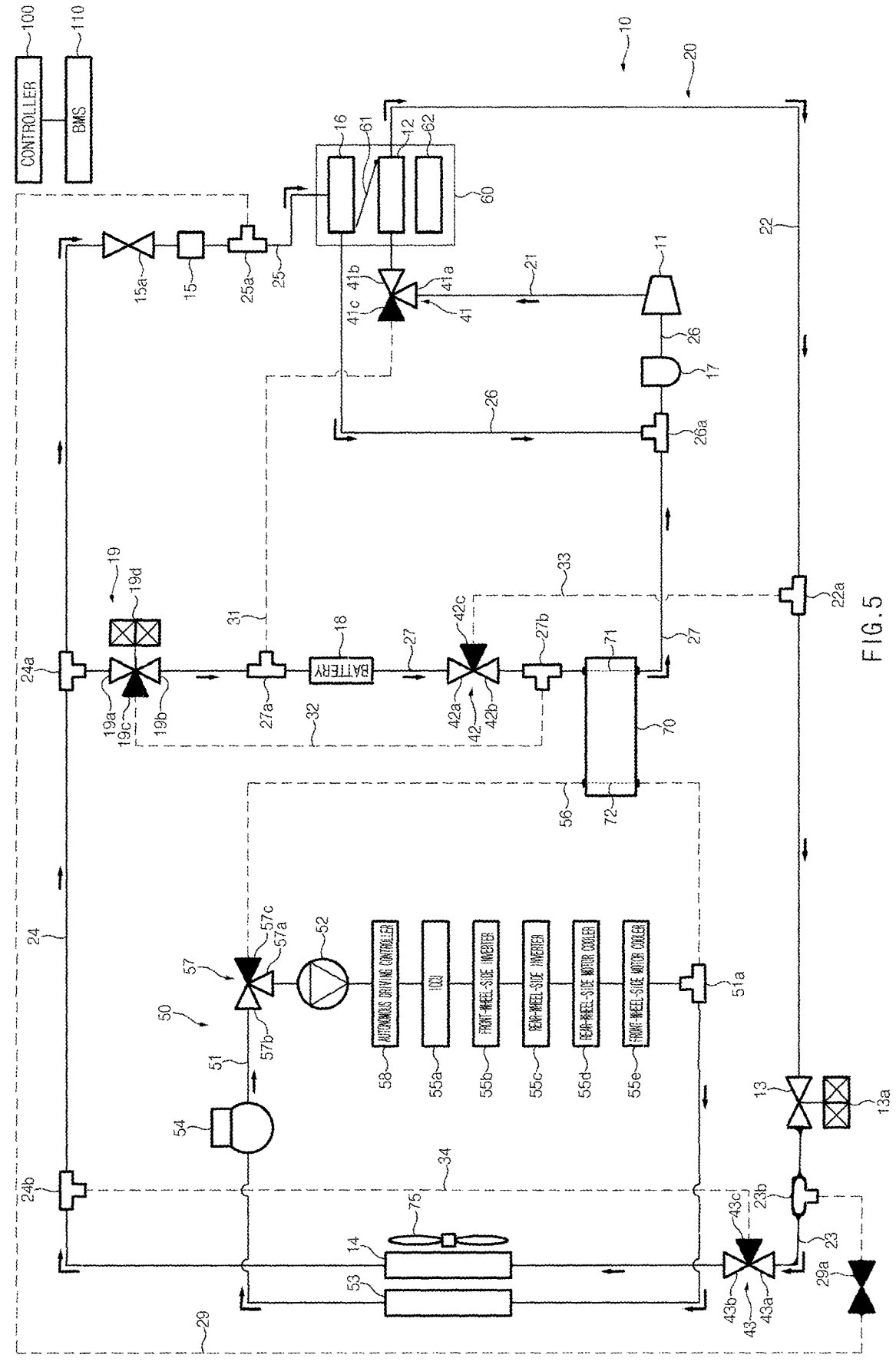
FIG. 5 illustrates an example of the flow of a refrigerant and the flow of a power electronics coolant when an HVAC subsystem operates in a cooling mode, a battery is directly cooled by the refrigerant, and power electronic components and an autonomous driving controller are cooled by a power electronic radiator in a vehicular thermal management system.

FIG. 5 illustrates the flow of the refrigerant and the flow of the power electronics coolant when the HVAC subsystem 10 operates in the cooling mode, the battery 18 is directly cooled by the refrigerant, and the power electronic components 55a, 55b, 55c, 55d, and 55e and the autonomous driving controller 58 are cooled by the power electronic radiator 53.

In a state in which the inlet port 19a of the battery-side expansion valve 19 is opened, the outlet port 19b of the battery-side expansion valve 19 is opened to a predetermined degree, the bypass port 19c of the battery-side expansion valve 19 is closed, the solenoid valve 15a of the cooling-side expansion valve 15 is opened, the first control valve 41 performs the first switching operation to allow the inlet port 41a to communicate with the first outlet port 41b, the second control valve 42 performs the first switching operation to allow the inlet port 42a to communicate with the first outlet port 42b, and the third control valve 43 performs the first switching operation to allow the inlet port 43a to communicate with the first outlet port 43b, the refrigerant sequentially passing through the compressor 11, the interior condenser 12, the heating-side expansion valve 13, and the exterior heat exchanger 14 can be distributed to the cooling-side expansion valve 15 and the battery-side expansion valve 19 at a predetermined ratio at the upstream point 24a of the cooling-side expansion valve 15 and then be joined in the accumulator 17. A portion of the refrigerant discharged from the cooling-side expansion valve 15 can sequentially pass through the evaporator 16 and the accumulator 17, and a remaining portion of the refrigerant discharged from the battery-side expansion valve 19 can sequentially pass through the refrigerant passage of the battery 18, the first passage 71 of the heat exchanger 70, and the accumulator 17.

In a state in which the switching valve 57 performs the first switching operation to allow the first port 57a to communicate with the second port 57b, the power electronics coolant discharged from the outlet of the power electronic pump 52 can pass through the power electronic radiator 53 so that the power electronics coolant can release heat to the ambient air through the power electronic radiator 53 and be cooled. The power electronics coolant cooled by the ambient air can cool the power electronic components 55a, 55b, 55c, 55d, and 55e and the autonomous driving controller 58.

Figure 6:
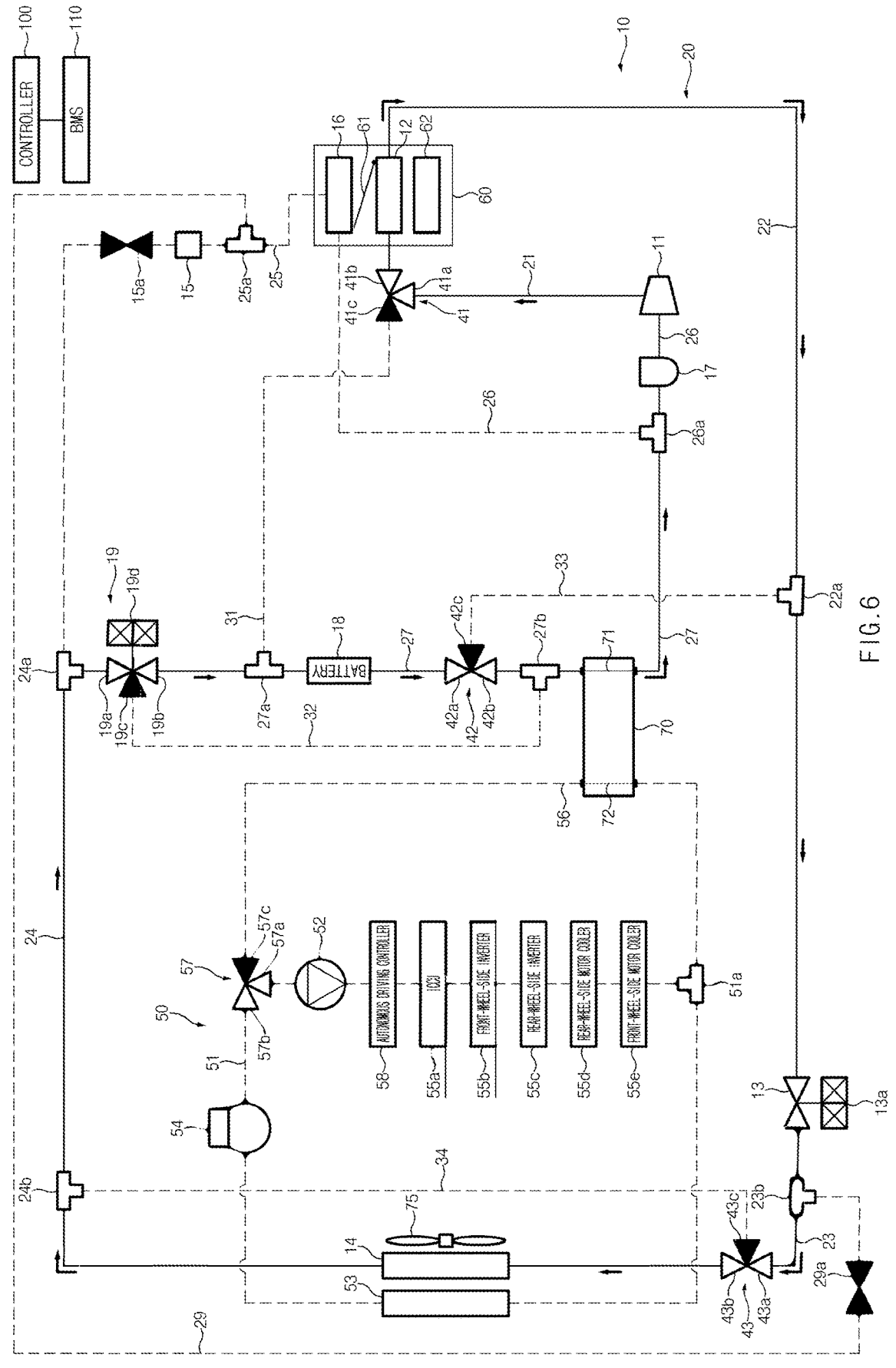
FIG. 6 illustrates an example of the flow of a refrigerant when a battery is directly cooled by the refrigerant in a vehicular thermal management system.

FIG. 6 illustrates the flow of the refrigerant when the battery 18 is directly cooled by the refrigerant.

In a state in which the solenoid valve 15a of the cooling-side expansion valve 15 is closed, the inlet port 19a of the battery-side expansion valve 19 is opened, the outlet port 19b of the battery-side expansion valve 19 is opened to a predetermined degree, the bypass port 19c of the battery-side expansion valve 19 is closed, the first control valve 41 performs the first switching operation to allow the inlet port 41a to communicate with the first outlet port 41b, the second control valve 42 performs the first switching operation to allow the inlet port 42a to communicate with the first outlet port 42b, and the third control valve 43 performs the first switching operation to allow the inlet port 43a to communicate with the first outlet port 43b, the refrigerant can sequentially pass through the compressor 11, the interior condenser 12, the heating-side expansion valve 13, the exterior heat exchanger 14, the battery-side expansion valve 19, the battery 18, the first passage 71 of the heat exchanger 70, and the accumulator 17.

The heating-side expansion valve 13 can be opened to a predetermined degree so that the refrigerant discharged from the interior condenser 12 can be primarily expanded, and the primarily expanded refrigerant can be primarily evaporated in the exterior heat exchanger 14. The refrigerant discharged from the exterior heat exchanger 14 can be directed to the refrigerant passage of the battery 18 through the battery-side expansion valve 19. The opening degree of the outlet port 19*b* of the battery-side expansion valve 19 can be adjusted by the actuator 19*d* to correspond to the cooling load of the battery 18, and accordingly the refrigerant can be secondarily expanded at the outlet port 19*b*, and the secondarily expanded refrigerant can be directed to the refrigerant passage of the battery 18. The refrigerant directed into the refrigerant passage of the battery 18 can directly absorb heat from the battery 18 so that the refrigerant can be secondarily evaporated in the refrigerant passage of the battery 18, and accordingly the battery 18 can be cooled by the evaporation of the refrigerant.

The power electronic pump 52 of the power electronics cooling subsystem 50 can be stopped so that the power electronics coolant may not circulate.

Figure 7:
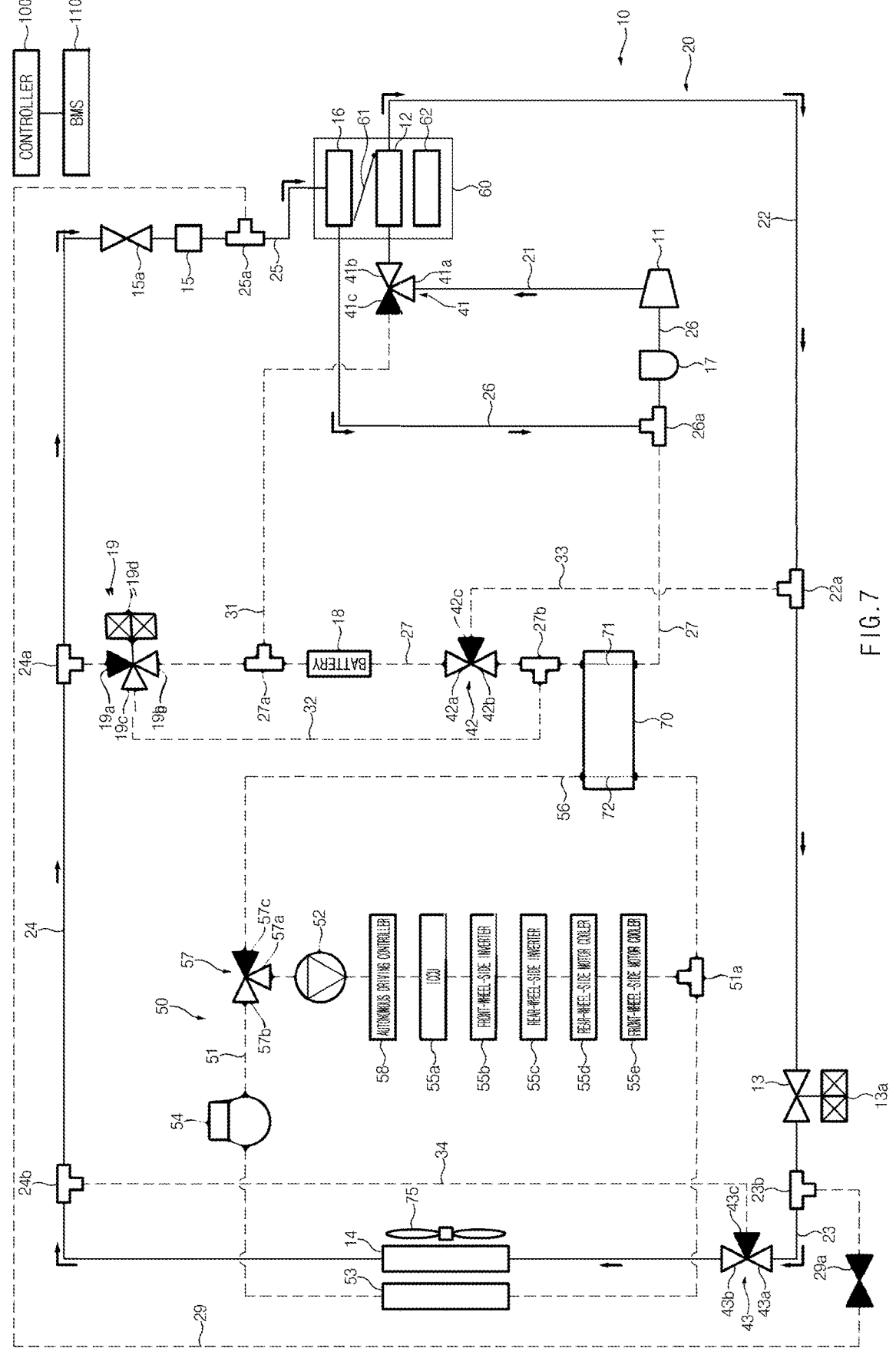
FIG. 7 illustrates an example of the flow of a refrigerant when an HVAC subsystem operates in a cooling mode in a vehicular thermal management system.

FIG. 7 illustrates the flow of the refrigerant when the HVAC subsystem 10 operates in the cooling mode.

In a state in which the inlet port 19*a* of the battery-side expansion valve 19 is closed, the solenoid valve 15*a* of the cooling-side expansion valve 15 is opened, the first control valve 41 performs the first switching operation to allow the inlet port 41*a* to communicate with the first outlet port 41*b*, and the third control valve 43 performs the first switching operation to allow the inlet port 43*a* to communicate with the first outlet port 43*b*, the refrigerant can sequentially pass through the compressor 11, the interior condenser 12, the heating-side expansion valve 13, the exterior heat exchanger 14, the cooling-side expansion valve 15, the evaporator 16, and the accumulator 17. Here, the heating-side expansion valve 13 can be fully opened (the opening degree of the heating-side expansion valve 13 is 100%) so that the refrigerant can pass through the heating-side expansion valve 13, and thus the refrigerant can be prevented from being expanded by the heating-side expansion valve 13. The opening degree of the cooling-side expansion valve 15 can be adjusted so that the refrigerant can be appropriately expanded by the cooling-side expansion valve 15 and then be directed to the evaporator 16.

The power electronic pump 52 of the power electronics cooling subsystem 50 can be stopped so that the power electronics coolant may not circulate.

Figure 8:
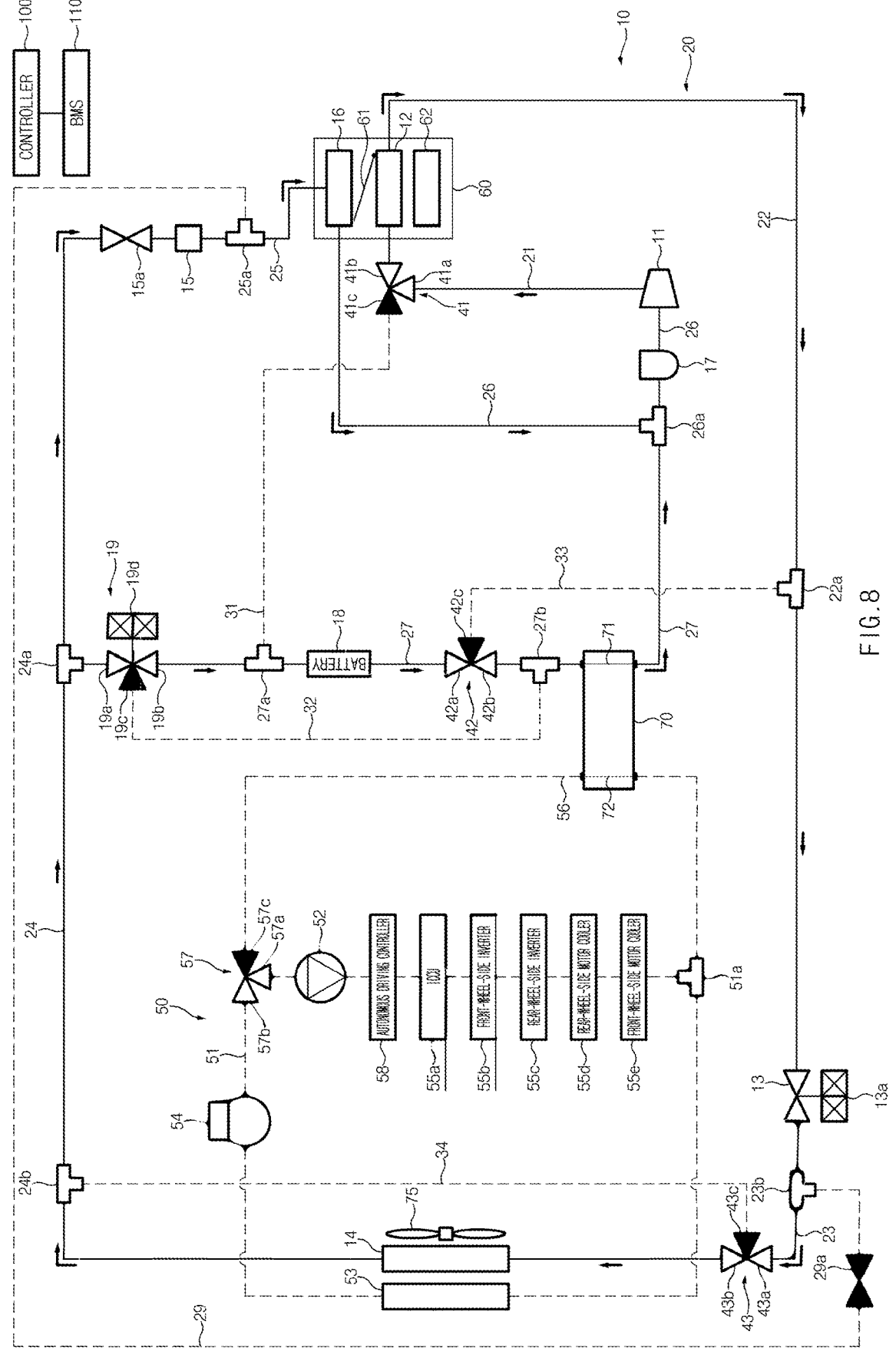
FIG. 8 illustrates an example of the flow of a refrigerant when an HVAC subsystem operates in a cooling mode and a battery is directly cooled by the refrigerant in a vehicular thermal management system.

FIG. 8 illustrates the flow of the refrigerant when the HVAC subsystem 10 operates in the cooling mode, and the battery 18 is directly cooled by the refrigerant.

In a state in which the inlet port 19*a* of the battery-side expansion valve 19 is opened, the outlet port 19*b* of the battery-side expansion valve 19 is opened to a predetermined degree, the bypass port 19*c* of the battery-side expansion valve 19 is closed, the solenoid valve 15*a* of the cooling-side expansion valve 15 is opened, the first control valve 41 performs the first switching operation to allow the inlet port 41*a* to communicate with the first outlet port 41*b*, the second control valve 42 performs the first switching operation to allow the inlet port 42*a* to communicate with the first outlet port 42*b*, and the third control valve 43 performs the first switching operation to allow the inlet port 43*a* to communicate with the first outlet port 43*b*, the refrigerant sequentially passing through the compressor 11, the interior condenser 12, the heating-side expansion valve 13, and the exterior heat exchanger 14 can be distributed to the cooling-side expansion valve 15 and the battery-side expansion valve 19 at a predetermined ratio at the upstream point 24*a* of the cooling-side expansion valve 15 and then be joined in the accumulator 17. A portion of the refrigerant discharged from the cooling-side expansion valve 15 can sequentially pass through the evaporator 16 and the accumulator 17, and a remaining portion of the refrigerant discharged from the battery-side expansion valve 19 can sequentially pass through the refrigerant passage of the battery 18, the first passage 71 of the heat exchanger 70, and the accumulator 17.

The opening degree of the outlet port 19*b* of the battery-side expansion valve 19 can be adjusted by the actuator 19*d* to correspond to the cooling load of the battery 18, and accordingly the refrigerant can be expanded at the outlet port 19*b*, and the expanded refrigerant can be directed to the refrigerant passage of the battery 18. The refrigerant directed into the refrigerant passage of the battery 18 can directly absorb heat from the battery 18 so that the refrigerant can be evaporated in the refrigerant passage of the battery 18, and accordingly the battery 18 can be directly cooled by the evaporation of the refrigerant.

The power electronic pump 52 of the power electronics cooling subsystem 50 can be stopped so that the power electronics coolant may not circulate.

Figure 9:
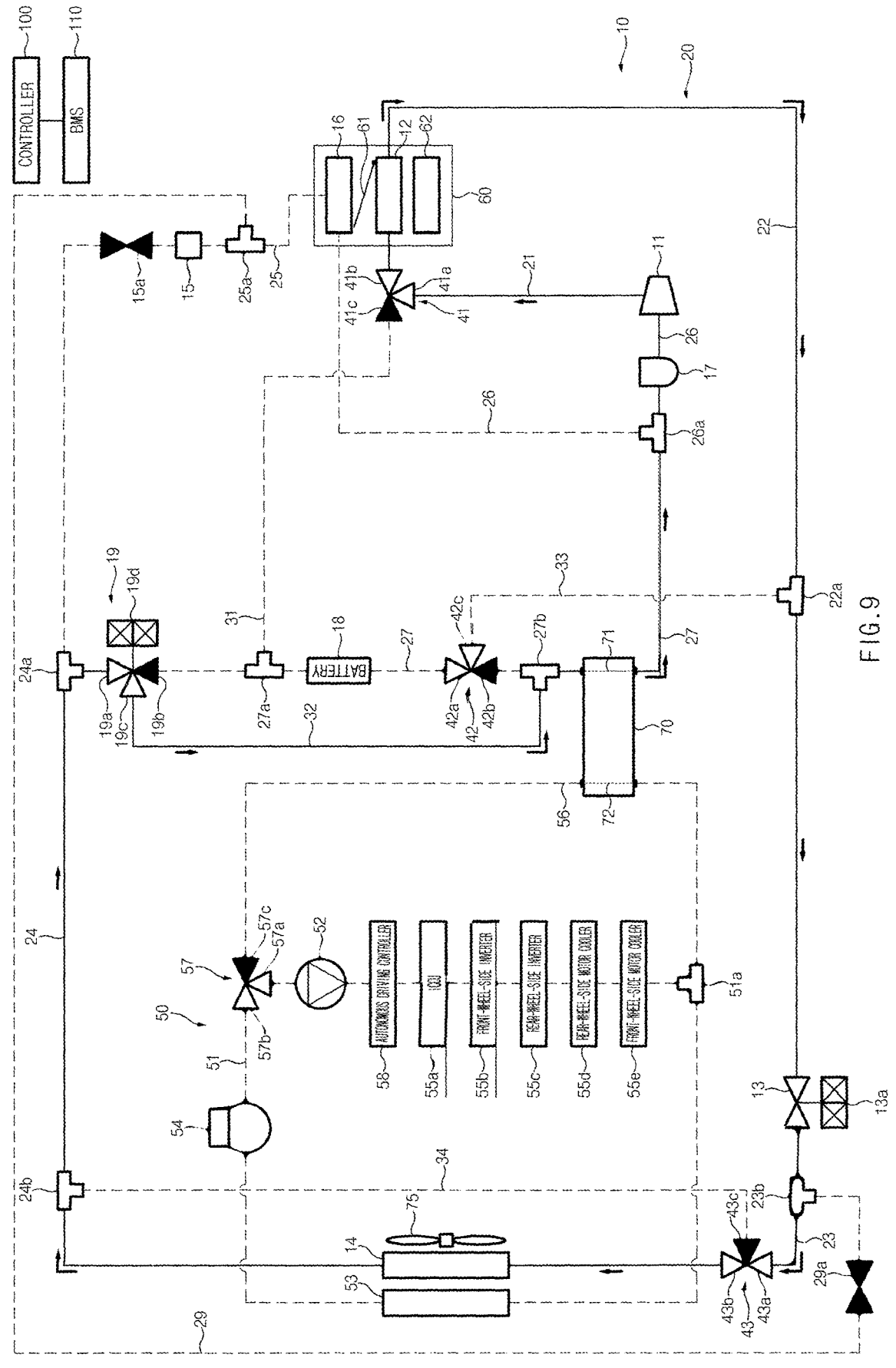
FIG. 9 illustrates an example of the flow of a refrigerant when an HVAC subsystem operates in a heating mode using an exterior heat exchanger in a vehicular thermal management system.

FIG. 9 illustrates the flow of the refrigerant when the HVAC subsystem 10 operates in the heating mode using the exterior heat exchanger 14.

In a state in which the inlet port 19*a* of the battery-side expansion valve 19 is opened, the bypass port 19*c* of the battery-side expansion valve 19 is opened, the outlet port 19*b* of the battery-side expansion valve 19 is closed, the heating-side expansion valve 13 is opened to a predetermined degree, the first control valve 41 performs the first switching operation to allow the inlet port 41*a* to communicate with the first outlet port 41*b*, and the third control valve 43 performs the first switching operation to allow the inlet port 43*a* to communicate with the first outlet port 43*b*, the refrigerant can sequentially pass through the compressor 11, the interior condenser 12, the heating-side expansion valve 13, the exterior heat exchanger 14, the upstream bypass line 32, the first passage 71 of the heat exchanger 70, and the accumulator 17.

The heating-side expansion valve 13 can be opened to a predetermined degree so that the refrigerant discharged from the interior condenser 12 can be expanded, and the expanded refrigerant can absorb heat from the ambient air through the exterior heat exchanger 14 so that the refrigerant can be evaporated in the exterior heat exchanger 14. The refrigerant discharged from the exterior heat exchanger 14 can be directed to the first passage 71 of the heat exchanger 70 through the bypass port 19*c* of the battery-side expansion valve 19 and the upstream bypass line 32.

The power electronic pump 52 of the power electronics cooling subsystem 50 can be stopped so that the power electronics coolant may not circulate.

Figure 10:
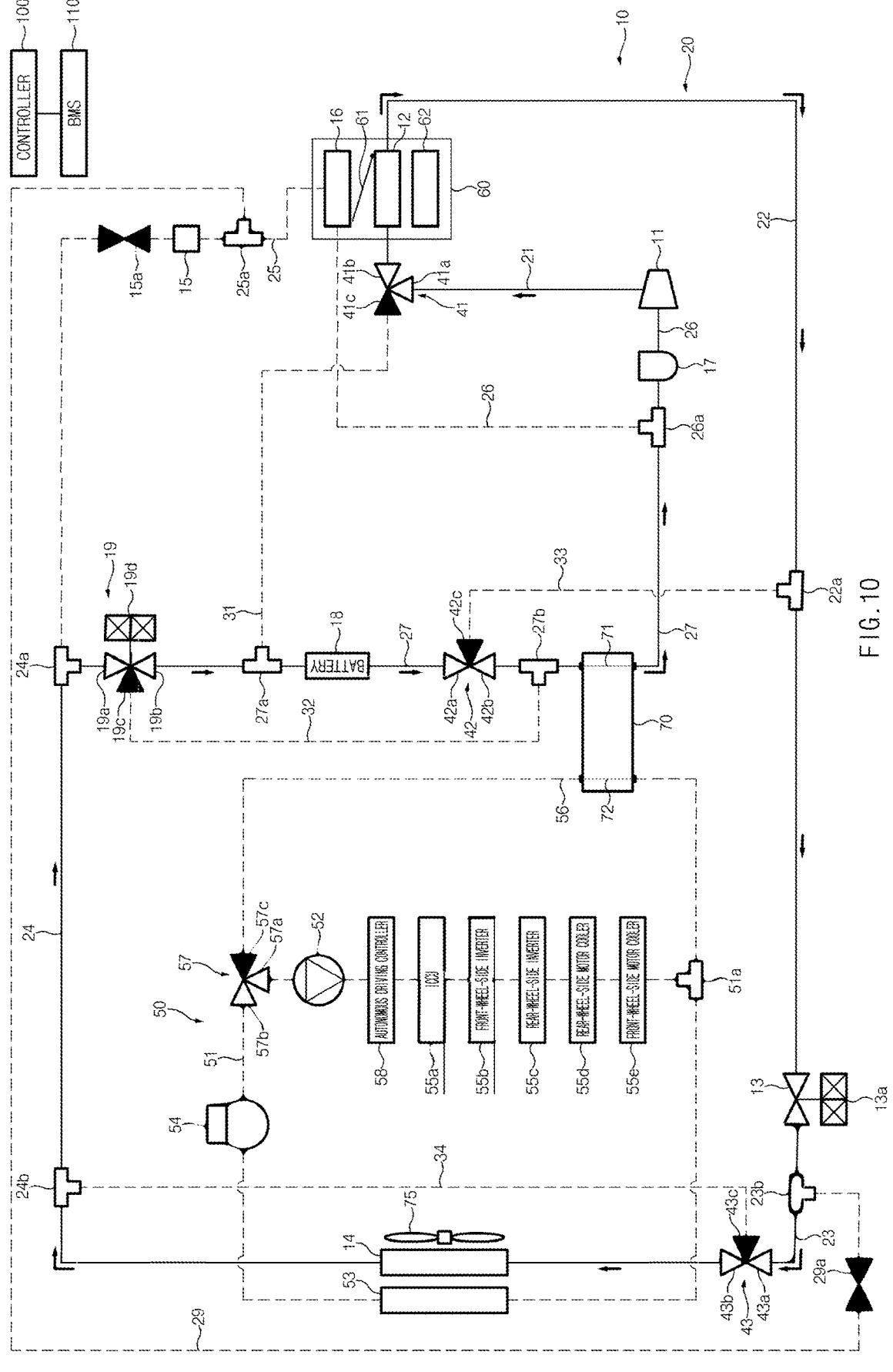
FIG. 10 illustrates an example of the flow of a refrigerant when an HVAC subsystem operates in a heating mode using an exterior heat exchanger and waste heat of a battery in a vehicular thermal management system.

FIG. 10 illustrates the flow of the refrigerant when the HVAC subsystem 10 operates in the heating mode using the exterior heat exchanger 14 and the waste heat of the battery 18.

In a state in which the solenoid valve 15*a* of the cooling-side expansion valve 15 is closed, the inlet port 19*a* of the battery-side expansion valve 19 is opened, the outlet port 19*b* of the battery-side expansion valve 19 is opened to a predetermined degree, the bypass port 19*c* of the battery-side expansion valve 19 is closed, the first control valve 41 performs the first switching operation to allow the inlet port 41*a* to communicate with the first outlet port 41*b*, the second control valve 42 performs the first switching operation to allow the inlet port 42*a* to communicate with the first outlet port 42*b*, and the third control valve 43 performs the first switching operation to allow the inlet port 43*a* to communicate with the first outlet port 43*b*, the refrigerant can sequentially pass through the compressor 11, the interior condenser 12, the heating-side expansion valve 13, the exterior heat exchanger 14, the battery-side expansion valve 19, the refrigerant passage of the battery 18, the first passage 71 of the heat exchanger 70, and the accumulator 17.

The heating-side expansion valve 13 can be opened to a predetermined degree so that the refrigerant discharged from the interior condenser 12 can be primarily expanded, and the primarily expanded refrigerant can absorb heat from the ambient air through the exterior heat exchanger 14 so that the refrigerant can be primarily evaporated in the exterior heat exchanger 14. The refrigerant discharged from the exterior heat exchanger 14 can be directed to the refrigerant passage of the battery 18 through the outlet port 19*b* of the battery-side expansion valve 19. The opening degree of the outlet port 19*b* of the battery-side expansion valve 19 can be adjusted by the actuator 19*d* to correspond to the cooling load of the battery 18, and accordingly the refrigerant can be secondarily expanded at the outlet port 19*b*, and the secondarily expanded refrigerant can be directed to the refrigerant passage of the battery 18. The refrigerant directed into the refrigerant passage of the battery 18 can absorb heat from the battery 18 so that the refrigerant can be secondarily evaporated in the refrigerant passage of the battery 18, and accordingly the battery 18 can be cooled by the evaporation of the refrigerant.

The power electronic pump 52 of the power electronics cooling subsystem 50 can be stopped so that the power electronics coolant may not circulate.

Figure 11:
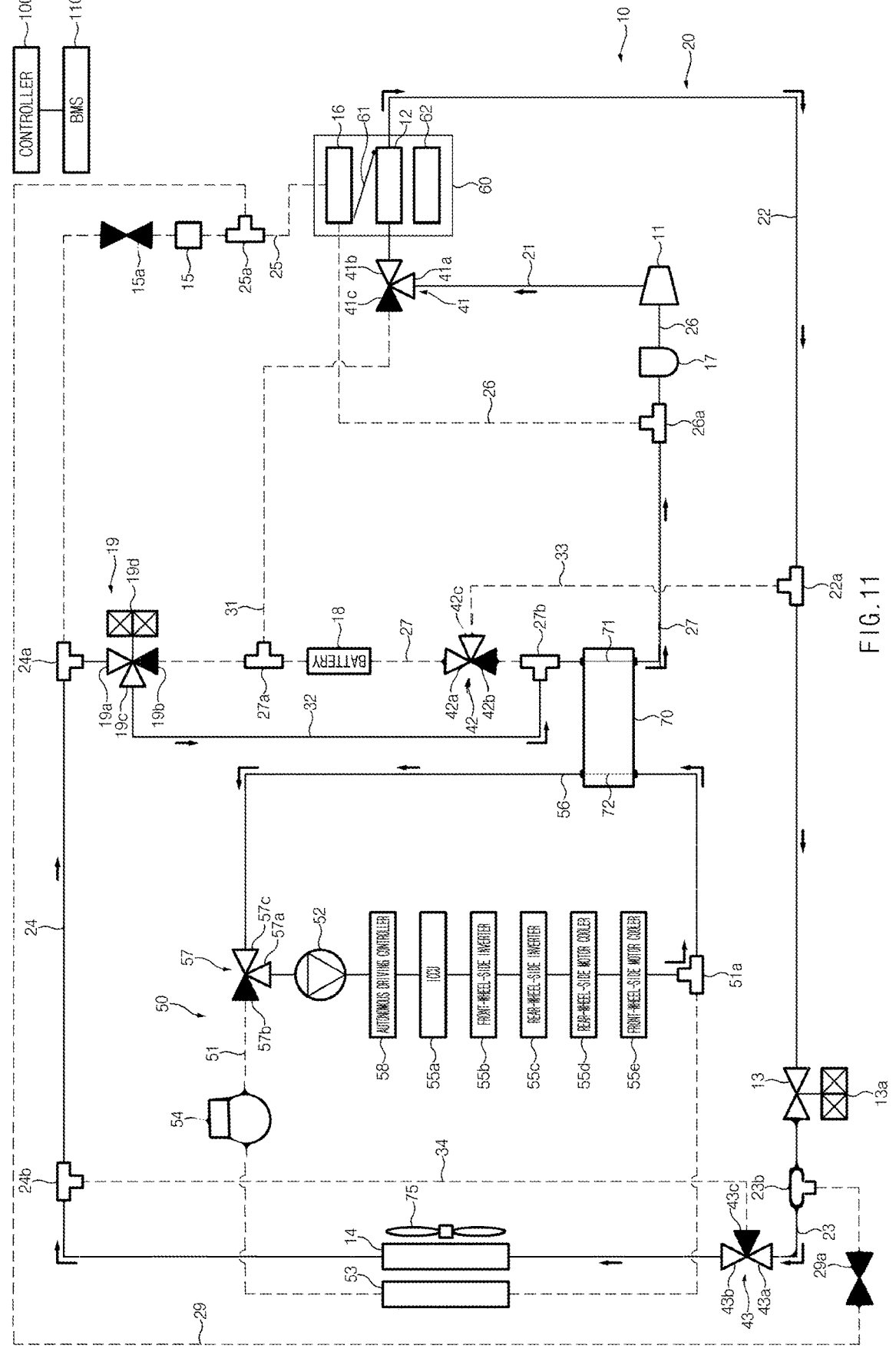
FIG. 11 illustrates an example of the flow of a refrigerant and the flow of a power electronics coolant when an HVAC subsystem operates in a heating mode using an exterior heat exchanger and a heat exchanger, and power electronic components and an autonomous driving controller are cooled by the heat exchanger in a vehicular thermal management system.

FIG. 11 illustrates the flow of the refrigerant and the flow of the power electronics coolant when the HVAC subsystem 10 operates in the heating mode using the exterior heat exchanger 14 and the heat exchanger 70, and the power electronic components 55*a*, 55*b*, 55*c*, 55*d*, and 55*e* and the autonomous driving controller 58 are cooled by the heat exchanger 70.

In a state in which the solenoid valve 15*a* of the cooling-side expansion valve 15 is closed, the inlet port 19*a* of the battery-side expansion valve 19 is opened, the outlet port 19*b* of the battery-side expansion valve 19 is closed, the bypass port 19*c* of the battery-side expansion valve 19 is opened, the first control valve 41 performs the first switching operation to allow the inlet port 41*a* to communicate with the first outlet port 41*b*, and the third control valve 43 performs the first switching operation to allow the inlet port 43*a* to communicate with the first outlet port 43*b*, the refrigerant can sequentially pass through the compressor 11, the interior condenser 12, the heating-side expansion valve 13, the exterior heat exchanger 14, the bypass port 19*c* of the battery-side expansion valve 19, the upstream bypass line 32, the first passage 71 of the heat exchanger 70, and the accumulator 17.

The heating-side expansion valve 13 can be opened to a predetermined degree so that the refrigerant discharged from the interior condenser 12 can be expanded. The expanded refrigerant can absorb heat from the ambient air through the exterior heat exchanger 14 so that the refrigerant can be evaporated in the exterior heat exchanger 14. The refrigerant discharged from the exterior heat exchanger 14 can be directed to the first passage 71 of the heat exchanger 70 through the bypass port 19*c* of the battery-side expansion valve 19 and the upstream bypass line 32.

In a state in which the switching valve 57 performs the second switching operation to allow the first port 57*a* to communicate with the third port 57*c*, the power electronics coolant discharged from the power electronic components

55*a*, 55*b*, 55*c*, 55*d*, and 55*e* can pass through the second passage 72 of the heat exchanger 70.

The refrigerant passing through the first passage 71 of the heat exchanger 70 can absorb heat from the power electronics coolant passing through the second passage 72 of the heat exchanger 70 so that the refrigerant can be evaporated, and the power electronics coolant can be cooled. That is, the refrigerant can indirectly absorb the waste heat of the power electronic components 55*a*, 55*b*, 55*c*, 55*d*, and 55*e* and the waste heat of the autonomous driving controller 58 in the heat exchanger 70. The power electronics coolant cooled by the heat exchanger 70 can cool the power electronic components 55*a*, 55*b*, 55*c*, 55*d*, and 55*e* and the autonomous driving controller 58.

Figure 12:
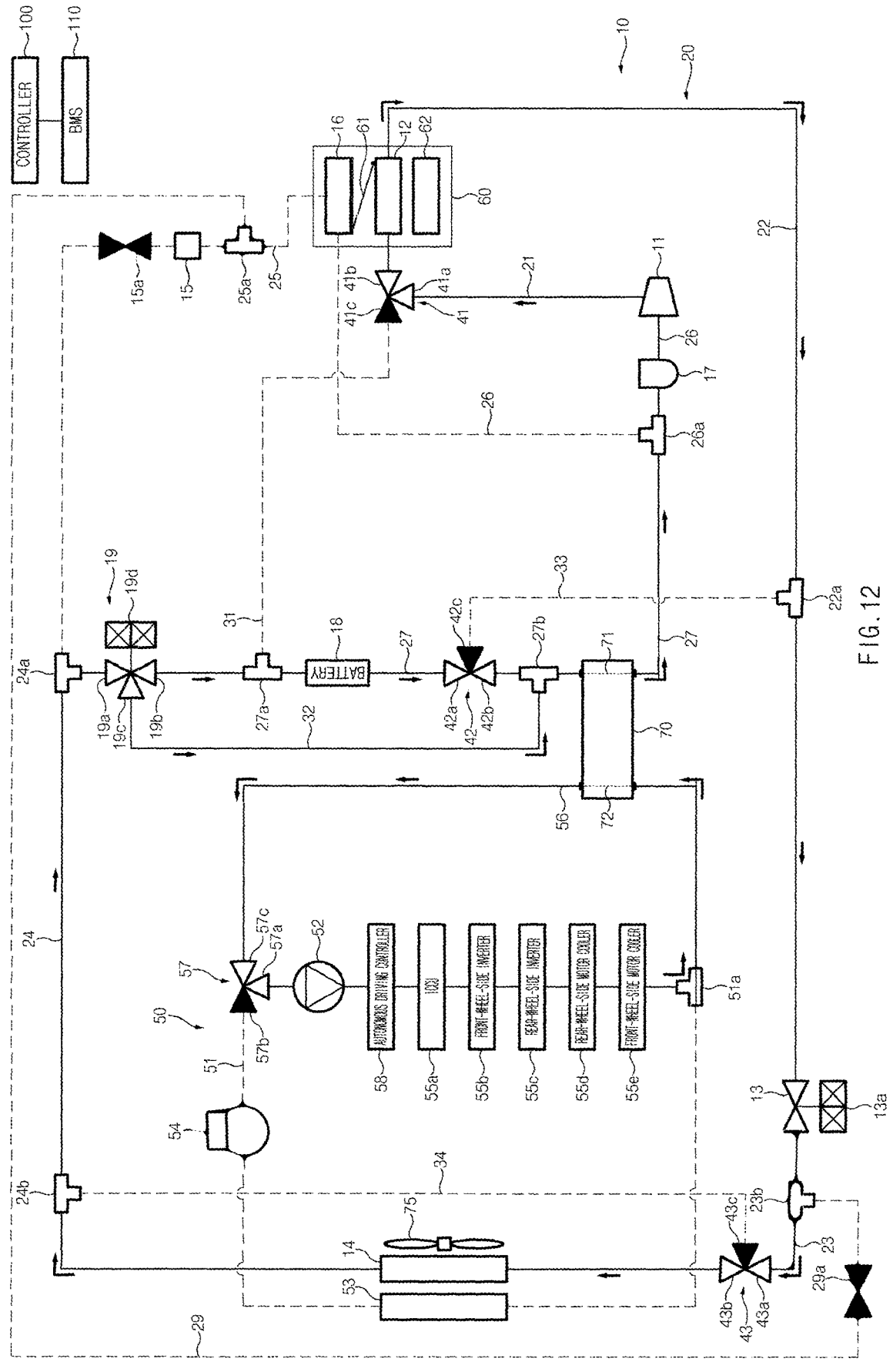
FIG. 12 illustrates an example of the flow of a refrigerant and the flow of a power electronics coolant when an HVAC subsystem operates in a heating mode using an exterior heat exchanger, a heat exchanger, and waste heat of a battery, and power electronic components and an autonomous driving controller are cooled by the heat exchanger in a vehicular thermal management system.

FIG. 12 illustrates the flow of the refrigerant and the flow of the power electronics coolant when the HVAC subsystem 10 operates in the heating mode using the exterior heat exchanger 14, the heat exchanger 70, and the waste heat of the battery 18, and the power electronic components 55*a*, 55*b*, 55*c*, 55*d*, and 55*e* and the autonomous driving controller 58 are cooled by the heat exchanger 70.

In a state in which the solenoid valve 15*a* of the cooling-side expansion valve 15 is closed, the inlet port 19*a* of the battery-side expansion valve 19 is opened, the outlet port 19*b* of the battery-side expansion valve 19 is opened to a predetermined degree, the bypass port 19*c* of the battery-side expansion valve 19 is opened, the first control valve 41 performs the first switching operation to allow the inlet port 41*a* to communicate with the first outlet port 41*b*, the second control valve 42 performs the first switching operation to allow the inlet port 42*a* to communicate with the first outlet port 42*b*, and the third control valve 43 performs the first switching operation to allow the inlet port 43*a* to communicate with the first outlet port 43*b*, the refrigerant can sequentially pass through the compressor 11, the interior condenser 12, the heating-side expansion valve 13, and the exterior heat exchanger 14, and the refrigerant discharged from the exterior heat exchanger 14 can be distributed to the refrigerant passage of the battery 18 and the upstream bypass line 32 at a predetermined ratio through the battery-side expansion valve 19.

The heating-side expansion valve 13 can be opened to a predetermined degree so that the refrigerant discharged from the interior condenser 12 can be primarily expanded, and the primarily expanded refrigerant can be primarily evaporated in the exterior heat exchanger 14. A portion of the refrigerant discharged from the exterior heat exchanger 14 can be directed to the refrigerant passage of the battery 18 through the outlet port 19*b* of the battery-side expansion valve 19. The opening degree of the outlet port 19*b* of the battery-side expansion valve 19 can be adjusted by the actuator 19*d* to correspond to the cooling load of the battery 18, and accordingly the refrigerant can be secondarily expanded at the outlet port 19*b*, and the secondarily expanded refrigerant can be directed to the refrigerant passage of the battery 18. The refrigerant directed into the refrigerant passage of the battery 18 can absorb heat from the battery 18 so that the refrigerant can be secondarily evaporated in the refrigerant passage of the battery 18, and accordingly the battery 18 can be directly cooled by the evaporation of the refrigerant.

A remaining portion of the refrigerant discharged from the exterior heat exchanger 14 can be directed to the first passage 71 of the heat exchanger 70 through the bypass port 19*c* of the battery-side expansion valve 19 and the upstream bypass line 32. The ratio of the refrigerant distributed to the refrigerant passage of the battery 18 and the upstream bypass line 32 can be determined depending on the temperature of the battery 18.

In a state in which the switching valve 57 performs the second switching operation to allow the first port 57a to communicate with the third port 57c, the power electronics coolant discharged from the power electronic components 55a, 55b, 55c, 55d, and 55e can pass through the second passage 72 of the heat exchanger 70.

The refrigerant passing through the first passage 71 of the heat exchanger 70 can absorb heat from the power electronics coolant passing through the second passage 72 of the heat exchanger 70 so that the refrigerant can be evaporated, and the power electronics coolant can be cooled. That is, the refrigerant can indirectly absorb the waste heat of the power electronic components 55a, 55b, 55c, 55d, and 55e and the waste heat of the autonomous driving controller 58 in the heat exchanger 70. The power electronics coolant cooled by the heat exchanger 70 can cool the power electronic components 55a, 55b, 55c, 55d, and 55e and the autonomous driving controller 58.

Figure 13:
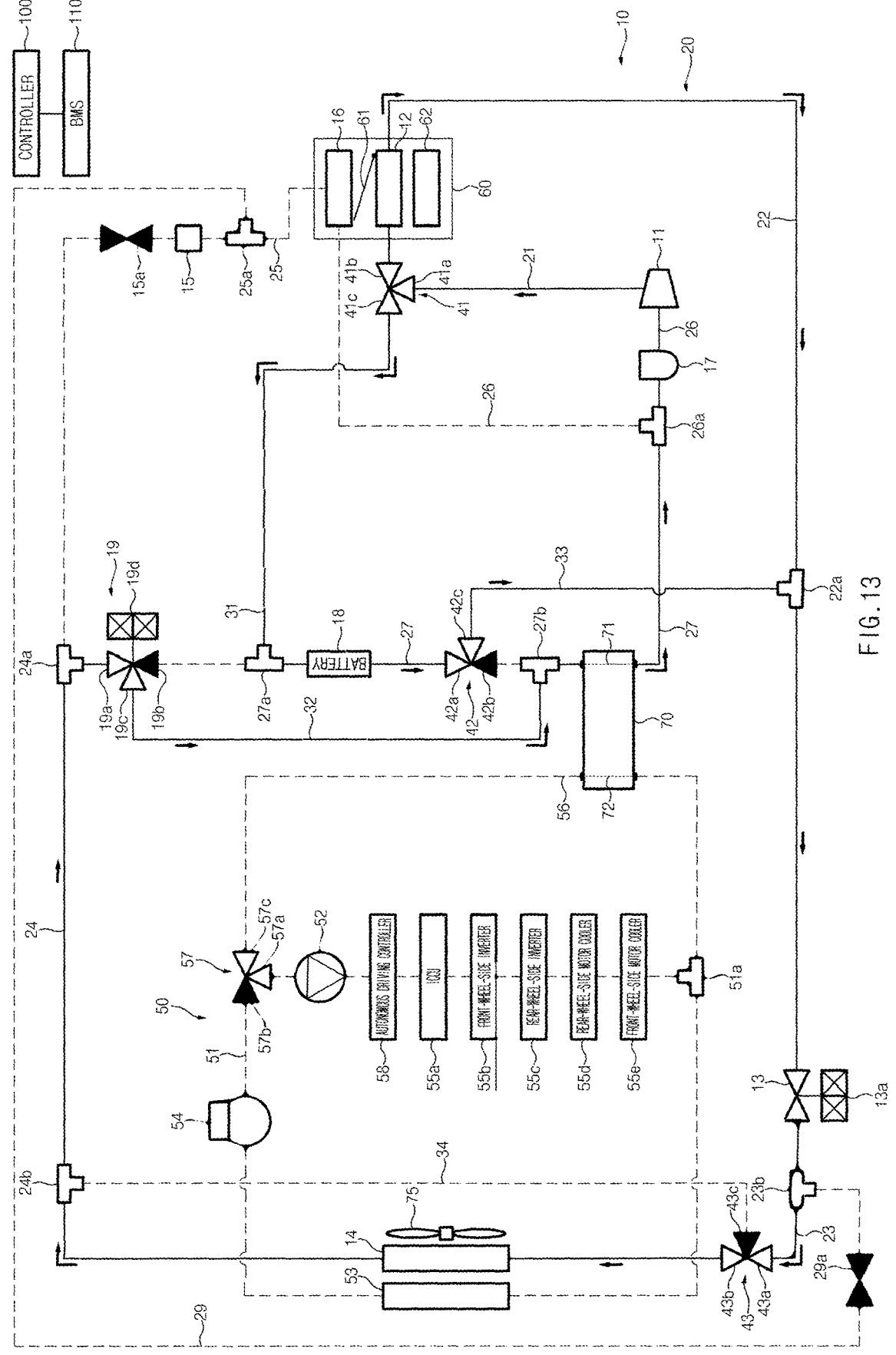
FIG. 13 illustrates an example of the flow of a refrigerant when a temperature of a battery is increased, and an HVAC subsystem operates in a heating mode using an exterior heat exchanger in a vehicular thermal management system.

FIG. 13 illustrates the flow of the refrigerant when the temperature of the battery 18 is increased, and the HVAC subsystem 10 operates in the heating mode using the exterior heat exchanger 14.

In a state in which the solenoid valve 15a of the cooling-side expansion valve 15 is closed, the inlet port 19a of the battery-side expansion valve 19 is opened, the outlet port 19b of the battery-side expansion valve 19 is closed, the bypass port 19c of the battery-side expansion valve 19 is opened, the first control valve 41 performs the second switching operation to allow the inlet port 41a to communicate with the first outlet port 41b and the second outlet port 41c at the same time, the second control valve 42 performs the second switching operation to allow the inlet port 42a to communicate with the second outlet port 42c, and the third control valve 43 performs the first switching operation to allow the inlet port 43a to communicate with the first outlet port 43b, the refrigerant discharged from the compressor 11 can be distributed to the interior condenser 12 and the refrigerant passage of the battery 18 through the first control valve 41.

A portion of the refrigerant discharged from the compressor 11 can be directed to the interior condenser 12, the heating-side expansion valve 13, and the exterior heat exchanger 14 through the first outlet port 41b of the first control valve 41. The heating-side expansion valve 13 can be opened to a predetermined degree so that the refrigerant discharged from the interior condenser 12 can be expanded. The expanded refrigerant can absorb heat from the ambient air through the exterior heat exchanger 14 so that the refrigerant can be evaporated in the exterior heat exchanger 14. The refrigerant discharged from the exterior heat exchanger 14 can be directed to the first passage 71 of the heat exchanger 70 through the bypass port 19c of the battery-side expansion valve 19 and the upstream bypass line 32.

A remaining portion of the refrigerant discharged from the compressor 11 can be directed to the refrigerant passage of the battery 18 through the second outlet port 41c of the first control valve 41 and the warm-up line 31, and the refrigerant discharged from the refrigerant passage of the battery 18 can be directed to the upstream point 22a of the heating-side expansion valve 13 through the second outlet port 42c of the second control valve 42 and the downstream bypass line 33, and accordingly the refrigerant discharged from the interior condenser 12 and the refrigerant discharged from the refrigerant passage of the battery 18 can be joined at the upstream point 22a of the heating-side expansion valve 13. The refrigerant discharged from the compressor 11 can be in relatively high temperature and high pressure state, and the high temperature refrigerant can be directed to the inlet of the refrigerant passage of the battery 18 through the warm-up line 31 so that the high temperature refrigerant can increase the temperature of the battery 18.

The power electronic pump 52 of the power electronics cooling subsystem 50 can be stopped so that the power electronics coolant may not circulate.

Figure 14:
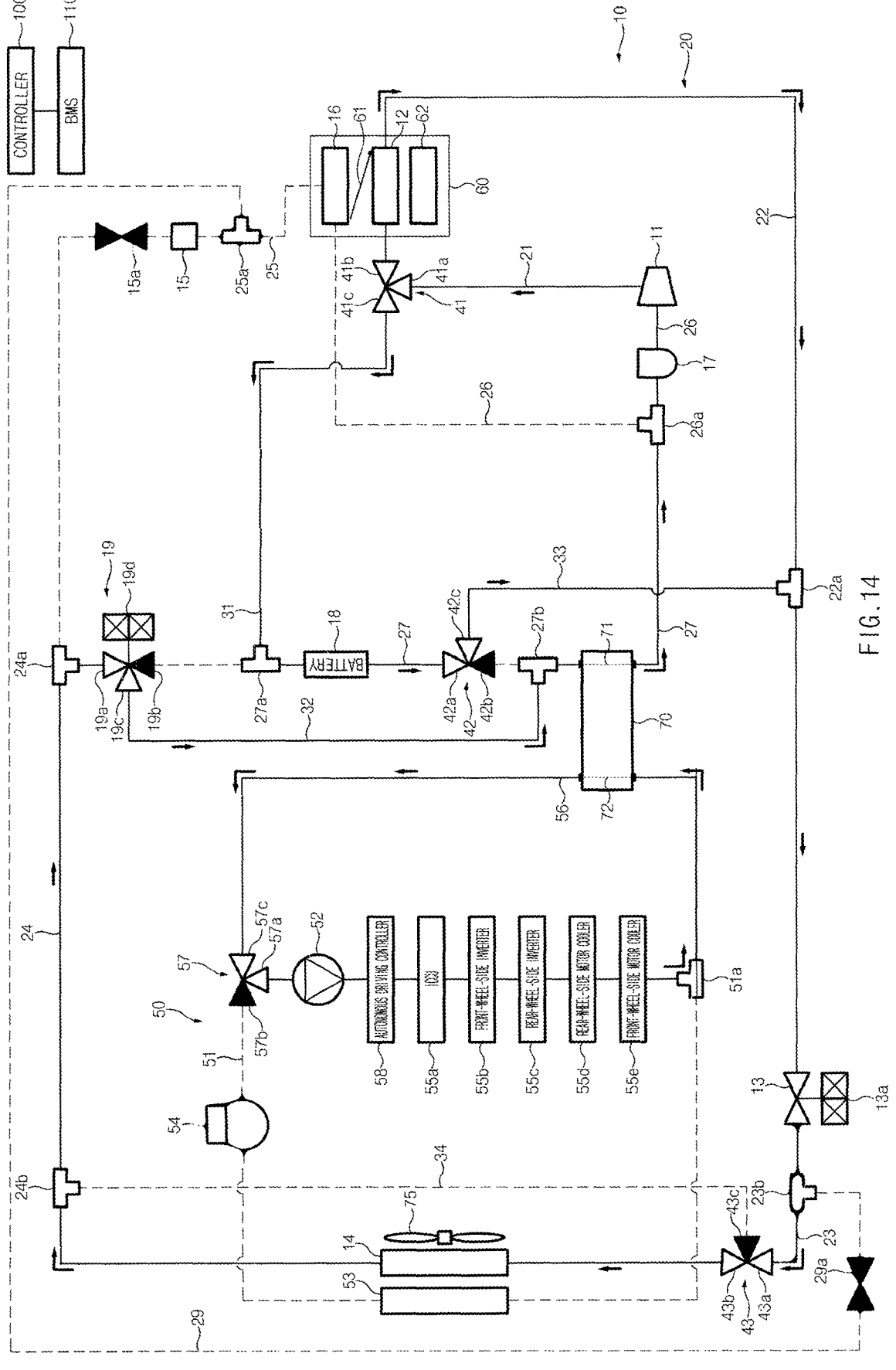
FIG. 14 illustrates an example of the flow of a refrigerant and the flow of a power electronics coolant when a temperature of a battery is increased, an HVAC subsystem operates in a heating mode using an exterior heat exchanger and a heat exchanger, and power electronic components and an autonomous driving controller are cooled by the heat exchanger in a vehicular thermal management system.

FIG. 14 illustrates the flow of the refrigerant and the flow of the power electronics coolant when the temperature of the battery 18 is increased, the HVAC subsystem 10 operates in the heating mode using the exterior heat exchanger 14 and the heat exchanger 70, and the power electronic components 55a, 55b, 55c, 55d, and 55e and the autonomous driving controller 58 are cooled by the heat exchanger 70.

In a state in which the solenoid valve 15a of the cooling-side expansion valve 15 is closed, the inlet port 19a of the battery-side expansion valve 19 is opened, the outlet port 19b of the battery-side expansion valve 19 is closed, the bypass port 19c of the battery-side expansion valve 19 is opened, the first control valve 41 performs the second switching operation to allow the inlet port 41a to communicate with the first outlet port 41b and the second outlet port 41c at the same time, the second control valve 42 performs the second switching operation to allow the inlet port 42a to communicate with the second outlet port 42c, and the third control valve 43 performs the first switching operation to allow the inlet port 43a to communicate with the first outlet port 43b, the refrigerant discharged from the compressor 11 can be distributed to the interior condenser 12 and the refrigerant passage of the battery 18 through the first control valve 41.

A portion of the refrigerant discharged from the compressor 11 can be directed to the interior condenser 12, the heating-side expansion valve 13, and the exterior heat exchanger 14 through the first outlet port 41b of the first control valve 41. The heating-side expansion valve 13 can be opened to a predetermined degree so that the refrigerant discharged from the interior condenser 12 can be expanded. The expanded refrigerant can absorb heat from the ambient air through the exterior heat exchanger 14 so that the refrigerant can be evaporated in the exterior heat exchanger 14. The refrigerant discharged from the exterior heat exchanger 14 can be directed to the first passage 71 of the heat exchanger 70 through the bypass port 19c of the battery-side expansion valve 19 and the upstream bypass line 32.

A remaining portion of the refrigerant discharged from the compressor 11 can be directed to the refrigerant passage of the battery 18 through the second outlet port 41c of the first control valve 41 and the warm-up line 31, and the refrigerant discharged from the refrigerant passage of the battery 18 can be directed to the upstream point 22a of the heating-side expansion valve 13 through the second outlet port 42c of the second control valve 42 and the downstream bypass line 33, and accordingly the refrigerant discharged from the interior condenser 12 and the refrigerant discharged from the refrigerant passage of the battery 18 can be joined at the upstream point 22a of the heating-side expansion valve 13. The refrigerant discharged from the compressor 11 can be in relatively high temperature and high pressure state, and the high temperature refrigerant can be directed to the inlet of the refrigerant passage of the battery 18 through the warm-up line 31 so that the high temperature refrigerant can directly increase the temperature of the battery 18.

In a state in which the switching valve 57 performs the second switching operation to allow the first port 57*a* to communicate with the third port 57*c*, the power electronics coolant discharged from the power electronic components 55*a*, 55*b*, 55*c*, 55*d*, and 55*e* can pass through the second passage 72 of the heat exchanger 70.

The refrigerant passing through the first passage 71 of the heat exchanger 70 can absorb heat from the power electronics coolant passing through the second passage 72 of the heat exchanger 70 so that the refrigerant can be evaporated, and the power electronics coolant can be cooled. That is, the refrigerant can absorb the waste heat of the power electronic components 55*a*, 55*b*, 55*c*, 55*d*, and 55*e* and the waste heat of the autonomous driving controller 58 in the heat exchanger 70. The power electronics coolant cooled by the heat exchanger 70 can cool the power electronic components 55*a*, 55*b*, 55*c*, 55*d*, and 55*e* and the autonomous driving controller 58.

Figure 15:
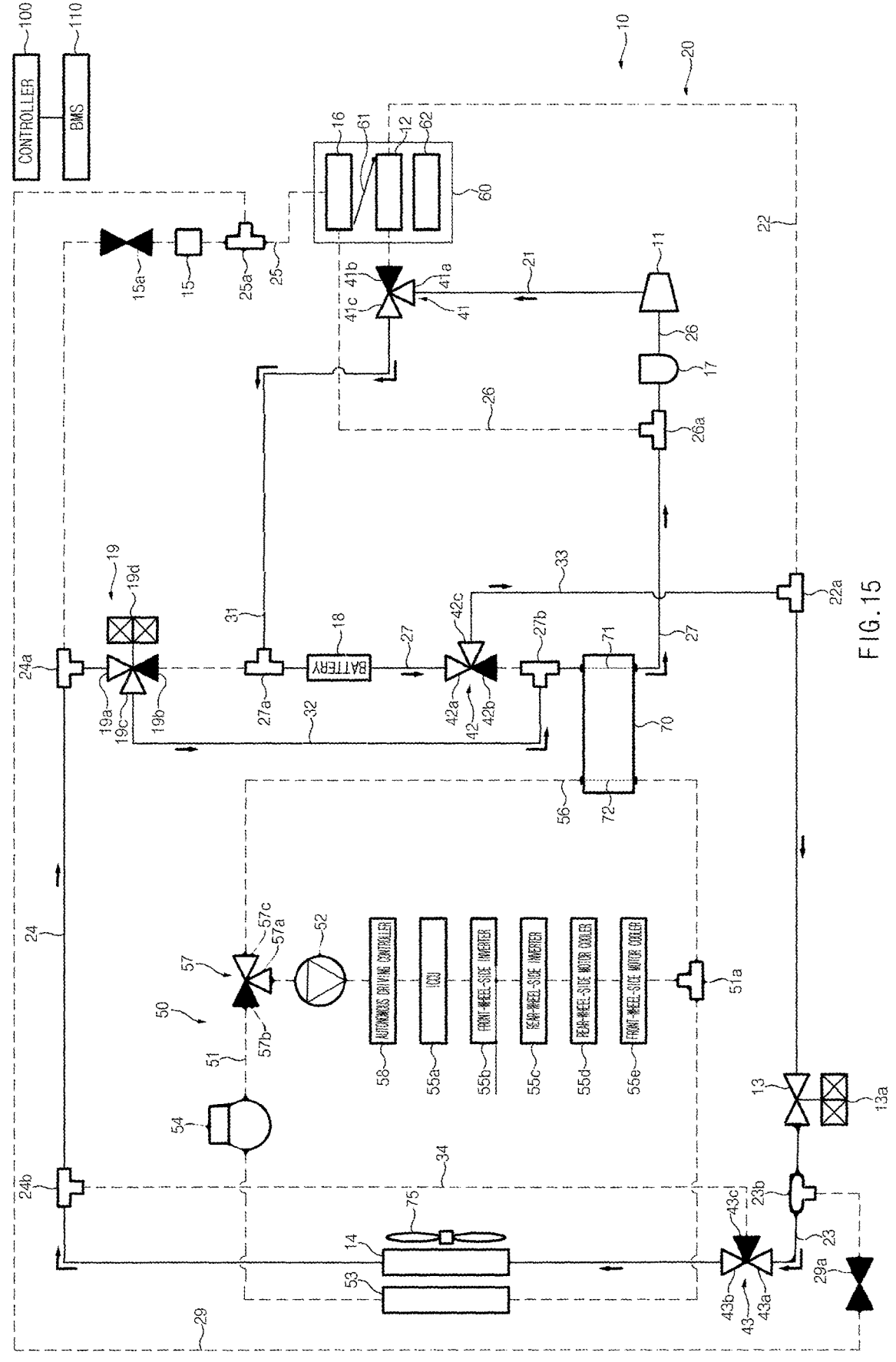
FIG. 15 illustrates an example of the flow of a refrigerant when a temperature of a battery is increased in a vehicular thermal management system.

FIG. 15 illustrates the flow of the refrigerant when the temperature of the battery 18 is increased.

In a state in which the solenoid valve 15*a* of the cooling-side expansion valve 15 is closed, the inlet port 19*a* of the battery-side expansion valve 19 is opened, the outlet port 19*b* of the battery-side expansion valve 19 is closed, the bypass port 19*c* of the battery-side expansion valve 19 is opened, the first control valve 41 performs the third switching operation to allow the inlet port 41*a* to communicate with the second outlet port 41*c*, the second control valve 42 performs the second switching operation to allow the inlet port 42*a* to communicate with the second outlet port 42*c*, and the third control valve 43 performs the first switching operation to allow the inlet port 43*a* to communicate with the first outlet port 43*b*, the refrigerant discharged from the compressor 11 can be directed to the refrigerant passage of the battery 18 through the second outlet port 41*c* of the first control valve 41 and the warm-up line 31. The refrigerant discharged from the compressor 11 can be in relatively high temperature and high pressure state, and the high temperature refrigerant can be directed to the inlet of the refrigerant passage of the battery 18 through the warm-up line 31 so that the high temperature refrigerant can increase the temperature of the battery 18, and the refrigerant can be cooled. The refrigerant discharged from the refrigerant passage of the battery 18 can be directed to the heating-side expansion valve 13 through the second outlet port 42*c* of the second control valve 42 and the downstream bypass line 33. The heating-side expansion valve 13 can be opened to a predetermined degree so that the refrigerant can be expanded. The expanded refrigerant can absorb heat from the ambient air through the exterior heat exchanger 14 so that the refrigerant can be evaporated in the exterior heat exchanger 14. The refrigerant discharged from the exterior heat exchanger 14 can be directed to the first passage 71 of the heat exchanger 70 through the bypass port 19*c* of the battery-side expansion valve 19 and the upstream bypass line 32, and then be directed to the accumulator 17 and the compressor 11.

When the heating of the passenger compartment is provided, the electric heater 62 disposed in the HVAC case 60 can be activated to heat the air blown into the passenger compartment.

Figure 16:
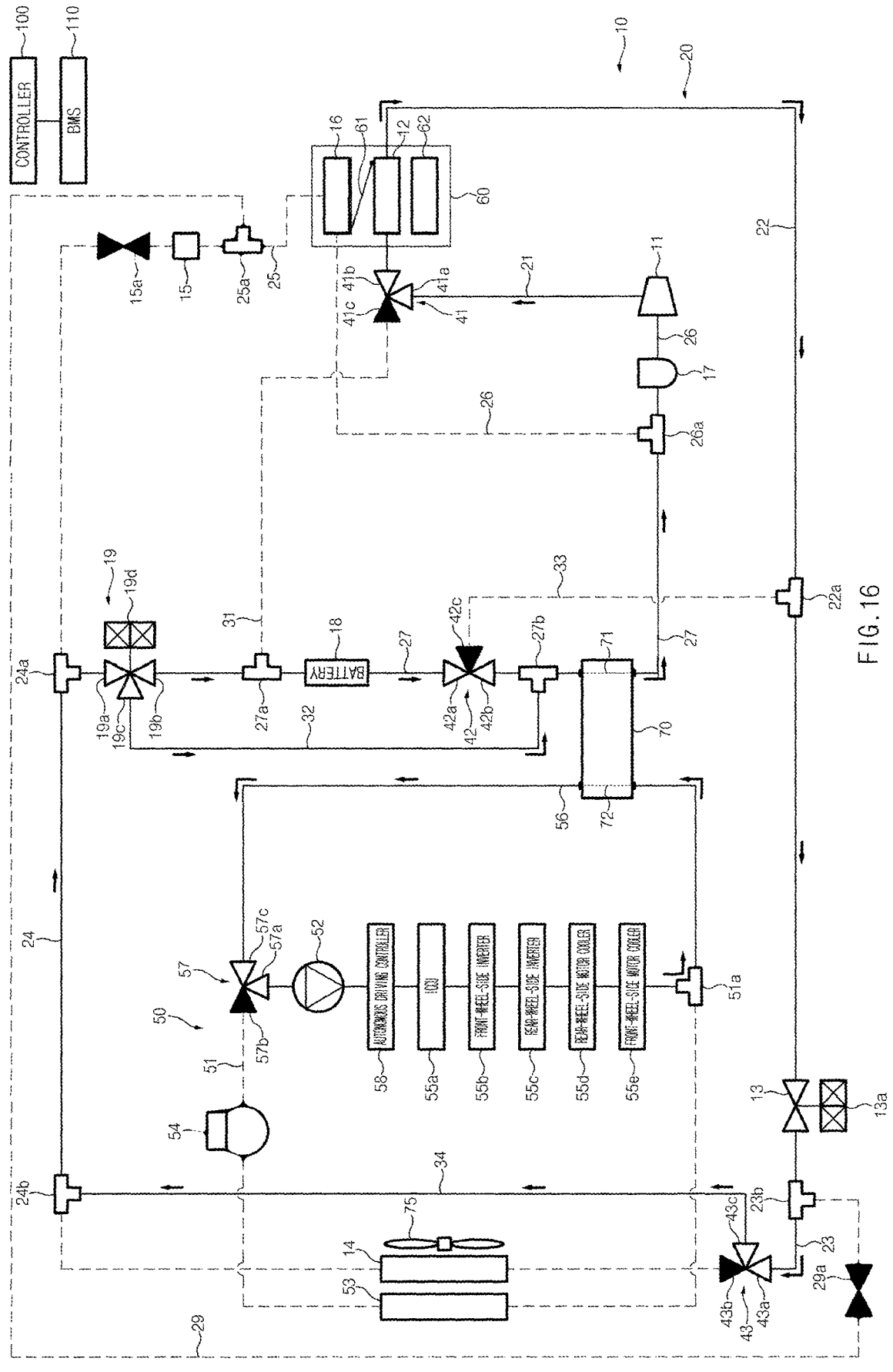
FIG. 16 illustrates an example of the flow of a refrigerant and the flow of a power electronics coolant when the refrigerant bypasses an exterior heat exchanger to prevent icing on the exterior heat exchanger, an HVAC subsystem operates in a heating mode using a heat exchanger, waste heat of power electronic components, waste heat of an autonomous driving controller, and waste heat of a battery, and the power electronic components and the autonomous driving controller are cooled by the heat exchanger in a vehicular thermal management system.

FIG. 16 illustrates the flow of the refrigerant and the flow of the power electronics coolant when the refrigerant bypasses the exterior heat exchanger 14 to prevent icing on the exterior heat exchanger 14, the HVAC subsystem 10 operates in the heating mode using the heat exchanger 70, the waste heat of the power electronic components 55*a*, 55*b*, 55*c*, 55*d*, and 55*e*, the waste heat of the autonomous driving controller 58, and the waste heat of the battery 18, and the power electronic components 55*a*, 55*b*, 55*c*, 55*d*, and 55*e* and the autonomous driving controller 58 are cooled by the heat exchanger 70.

In a state in which the solenoid valve 15*a* of the cooling-side expansion valve 15 is closed, the inlet port 19*a* of the battery-side expansion valve 19 is opened, the outlet port 19*b* of the battery-side expansion valve 19 is opened to a predetermined degree, the bypass port 19*c* of the battery-side expansion valve 19 is opened, the first control valve 41 performs the first switching operation to allow the inlet port 41*a* to communicate with the first outlet port 41*b*, the second control valve 42 performs the first switching operation to allow the inlet port 42*a* to communicate with the first outlet port 42*b*, and the third control valve 43 performs the second switching operation to allow the inlet port 43*a* to communicate with the second outlet port 43*c*, the refrigerant can pass through the compressor 11, the interior condenser 12, and the heating-side expansion valve 13, and the refrigerant discharged from the heating-side expansion valve 13 can be directed to the downstream point 24*b* of the exterior heat exchanger 14 through the second outlet port 43*c* of the third control valve 43 and the heat exchanger bypass line 34 so that the refrigerant can bypass the exterior heat exchanger 14. As the refrigerant bypasses the exterior heat exchanger 14, icing can be prevented from occurring on the exterior heat exchanger 14.

The refrigerant having bypassed the exterior heat exchanger 14 can be distributed to the refrigerant passage of the battery 18 and the upstream bypass line 32 at a predetermined ratio through the battery-side expansion valve 19.

The heating-side expansion valve 13 can be opened to a predetermined degree so that the refrigerant discharged from the interior condenser 12 can be expanded. The expanded refrigerant can be evaporated in the refrigerant passage of the battery 18 and the heat exchanger 70. A portion of the refrigerant discharged from the heating-side expansion valve 13 can be directed to the refrigerant passage of the battery 18 through the outlet port 19*b* of the battery-side expansion valve 19. The opening degree of the outlet port 19*b* of the battery-side expansion valve 19 can be adjusted by the actuator 19*d* to correspond to the cooling load of the battery 18, and accordingly the refrigerant can be expanded at the outlet port 19*b*, and the expanded refrigerant can be directed to the refrigerant passage of the battery 18. The refrigerant directed into the refrigerant passage of the battery 18 can absorb heat from the battery 18 so that the refrigerant can be evaporated in the refrigerant passage of the battery 18, and accordingly the battery 18 can be cooled by the evaporation of the refrigerant. That is, the refrigerant can absorb the waste heat of the battery 18.

A remaining portion of the refrigerant discharged from the heating-side expansion valve 13 can be directed to the first passage 71 of the heat exchanger 70 through the bypass port 19*c* of the battery-side expansion valve 19 and the upstream bypass line 32. The ratio of the refrigerant distributed to the refrigerant passage of the battery 18 and the upstream bypass line 32 can be determined depending on the temperature of the battery 18.

In a state in which the switching valve 57 performs the second switching operation to allow the first port 57*a* to communicate with the third port 57*c*, the power electronics coolant discharged from the power electronic components 55*a*, 55*b*, 55*c*, 55*d*, and 55*e* can pass through the second passage 72 of the heat exchanger 70.

The refrigerant passing through the first passage 71 of the heat exchanger 70 can absorb heat from the power electronics coolant passing through the second passage 72 of the heat exchanger 70 so that the refrigerant can be evaporated, and the power electronics coolant can be cooled. That is, the refrigerant can absorb the waste heat of the power electronic components 55a, 55b, 55c, 55d, and 55e and the waste heat of the autonomous driving controller 58 in the heat exchanger 70. The power electronics coolant cooled by the heat exchanger 70 can cool the power electronic components 55a, 55b, 55c, 55d, and 55e and the autonomous driving controller 58.

Figure 17:
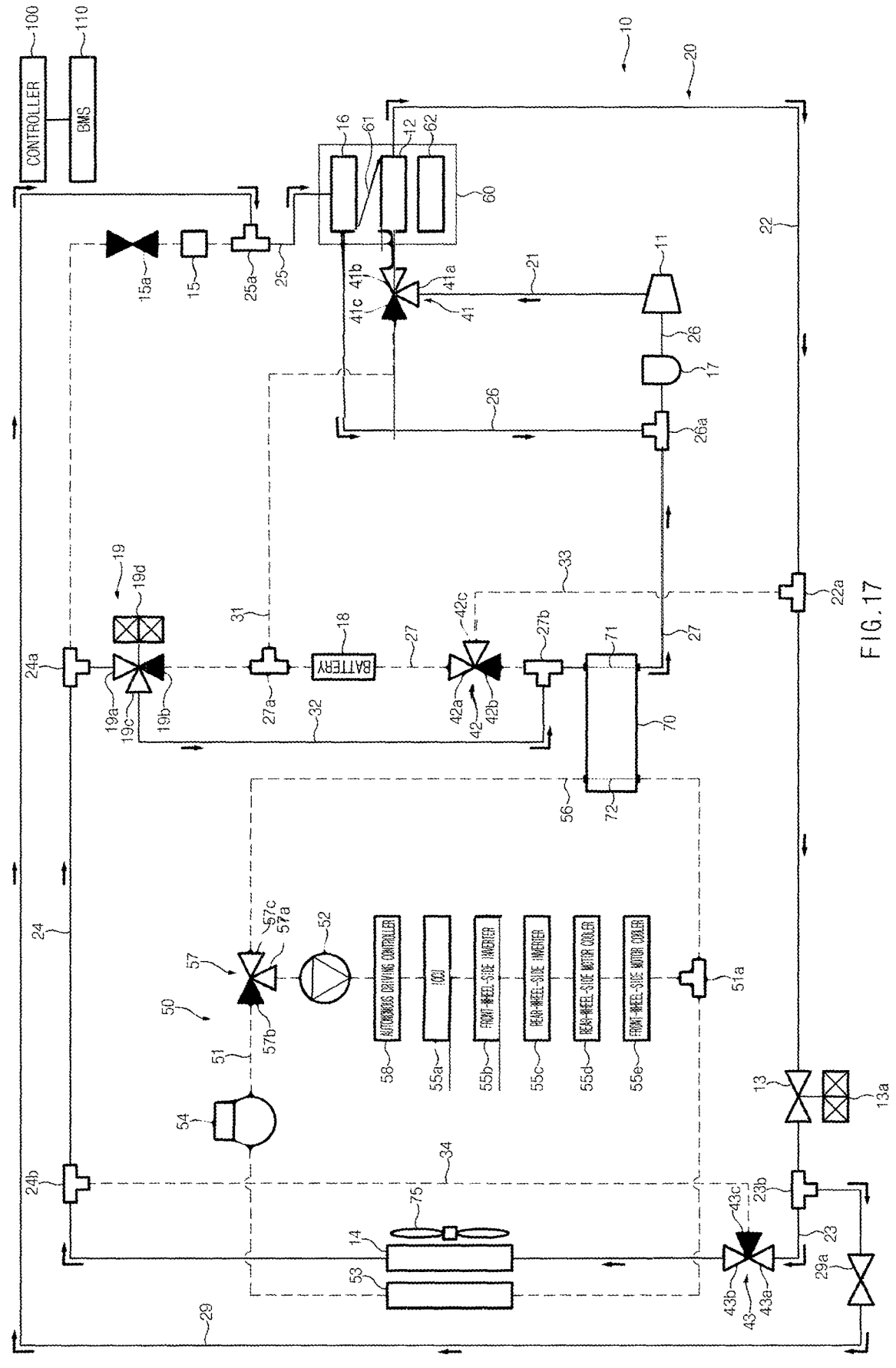
FIG. 17 illustrates an example of the flow of a refrigerant when an HVAC subsystem operates in a heating and dehumidification mode using an exterior heat exchanger in a vehicular thermal management system.

FIG. 17 illustrates the flow of the refrigerant when the HVAC subsystem 10 operates in a heating and dehumidification mode using the exterior heat exchanger 14.

In a state in which the solenoid valve 15a of the cooling-side expansion valve 15 is closed, the shut-off valve 29a of the dehumidification bypass line 29 is opened, the inlet port 19a of the battery-side expansion valve 19 is opened, the outlet port 19b of the battery-side expansion valve 19 is closed, the bypass port 19c of the battery-side expansion valve 19 is opened, the first control valve 41 performs the first switching operation to allow the inlet port 41a to communicate with the first outlet port 41b, and the third control valve 43 performs the first switching operation to allow the inlet port 43a to communicate with the first outlet port 43b, the refrigerant can sequentially pass through the compressor 11, the interior condenser 12, and the heating-side expansion valve 13. A portion of the refrigerant discharged from the heating-side expansion valve 13 can sequentially pass through the first outlet port 43b of the third control valve 43, the exterior heat exchanger 14, the bypass port 19c of the battery-side expansion valve 19, the upstream bypass line 32, the first passage 71 of the heat exchanger 70, the accumulator 17, and the compressor 11.

The heating-side expansion valve 13 can be opened to a predetermined degree so that the refrigerant discharged from the interior condenser 12 can be expanded. The expanded refrigerant can absorb heat from the ambient air through the exterior heat exchanger 14 so that the refrigerant can be evaporated in the exterior heat exchanger 14. The refrigerant discharged from the exterior heat exchanger 14 can be directed to the first passage 71 of the heat exchanger 70 through the bypass port 19c of the battery-side expansion valve 19 and the upstream bypass line 32.

A remaining portion of the refrigerant discharged from the heating-side expansion valve 13 can be directed to the evaporator 16 through the dehumidification bypass line 29. The remaining portion of the refrigerant can be directed to the evaporator 16 so that the refrigerant can be evaporated in the evaporator 16, and the air passing by an exterior surface of the evaporator 16 can be cooled. Thus, the air flowing into the passenger compartment can be appropriately dehumidified.

Figure 18:
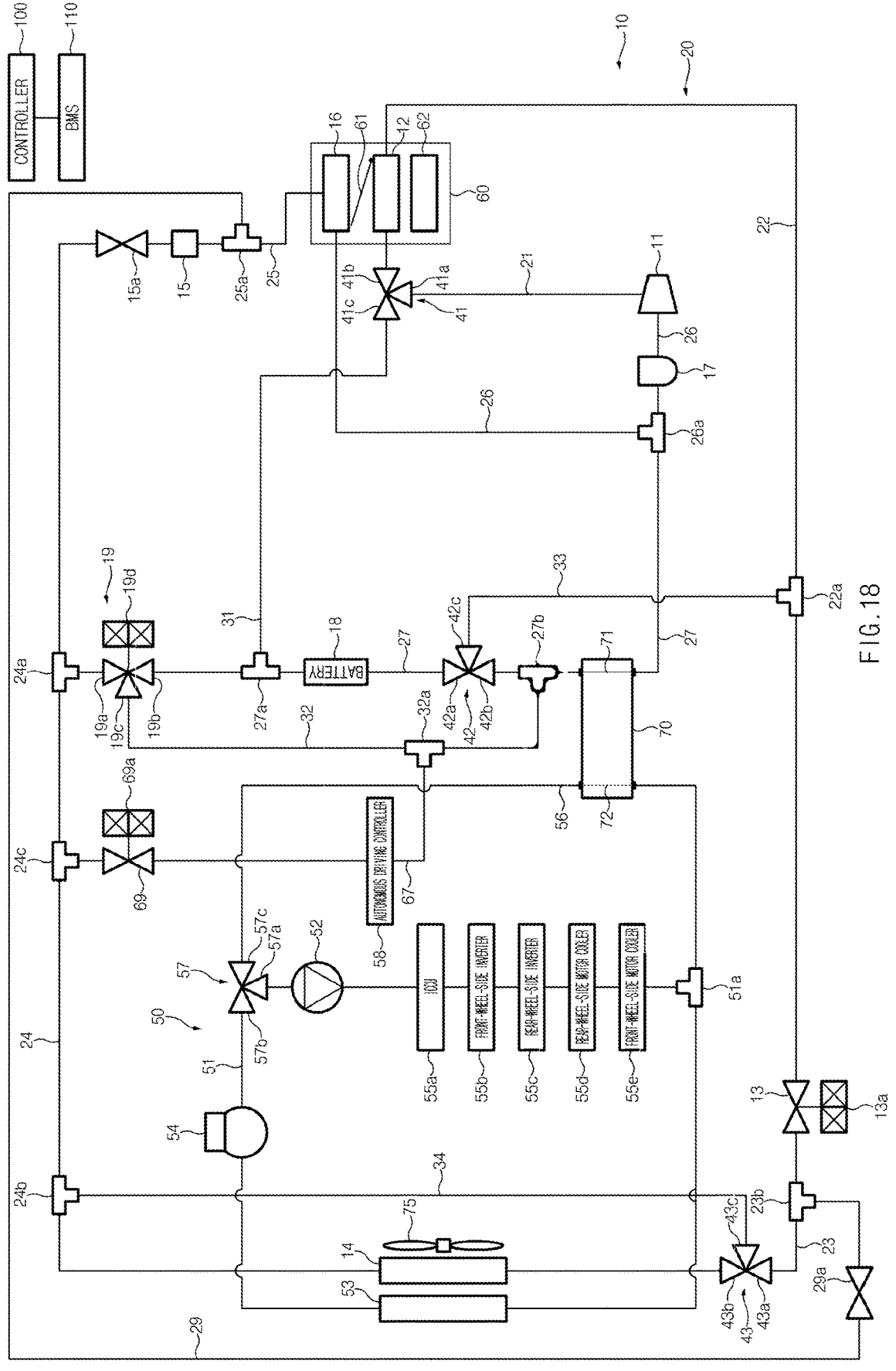
FIG. 18 illustrates an example of the vehicular thermal management system illustrated in FIG. 1.

FIG. 18 illustrates a modification of the vehicular thermal management system illustrated in FIG. 1.

Referring to FIG. 18, the HVAC subsystem 10 can further include a second distribution line 67 configured to allow the refrigerant discharged from the exterior heat exchanger 14 to be directed from an upstream point 24c of the cooling-side expansion valve 15 to the first passage 71 of the heat exchanger 70 through the upstream bypass line 32. An inlet of the second distribution line 67 can be connected to the fourth line 24 of the refrigerant circulation path 20 at the upstream point 24c of the cooling-side expansion valve 15, and the inlet of the second distribution line 67 can be located on the upstream side of the inlet of the distribution line 27.

An outlet of the second distribution line 67 can be connected to a point 32a of the upstream bypass line 32. Accordingly, at least a portion of the refrigerant discharged from the exterior heat exchanger 14 can be directed to the first passage 71 of the heat exchanger 70 through the second distribution line 67 and the upstream bypass line 32.

The autonomous driving controller 58 and an expansion valve 69 can be disposed on the second distribution line 67, and the expansion valve 69 can be disposed on the upstream side of the autonomous driving controller 58. The autonomous driving controller 58 can have a refrigerant passage provided inside or outside thereof, and the refrigerant passage of the autonomous driving controller 58 can be fluidly connected to the second distribution line 67. The expansion valve 69 can be configured to adjust the flow of the refrigerant and/or the flow rate of the refrigerant into the refrigerant passage of the autonomous driving controller 58, and to expand the refrigerant received from the exterior heat exchanger 14.

In some implementations, the expansion valve 69 can be an EXV having an actuator 69a. The actuator 69a can have a shaft which is movable to open or close an orifice defined in a valve body of the expansion valve 69, and the position of the shaft can be varied depending on the rotation direction, rotation degree, and the like of the actuator 69a, and accordingly the opening degree of the orifice of the expansion valve 69 can be varied. The controller 100 can control the operation of the actuator 69a. As the expansion valve 69 is opened to a predetermined degree, at least a portion of the refrigerant discharged from the exterior heat exchanger 14 can be expanded by the expansion valve 69, and the expanded refrigerant can pass through the refrigerant passage of the autonomous driving controller 58 so that the refrigerant can be evaporated in the refrigerant passage of the autonomous driving controller 58. Accordingly, the autonomous driving controller 58 can be directly cooled by the evaporation of the refrigerant.

The autonomous driving controller 58 can have a higher heat generating amount than the other power electronic components 55a, 55b, 55c, 55d, and 55e, and the refrigerant can directly cool the autonomous driving controller 58 through the second distribution line 67 and the expansion valve 69 so that the cooling of the autonomous driving controller 58 can be improved.

In addition, the autonomous driving controller 58 can be located on the upstream side of the first passage 71 of the heat exchanger 70 through the second distribution line 67 in the refrigerant flow direction so that the refrigerant evaporated in the autonomous driving controller 58 can absorb the waste heat of the power electronic components 55a, 55b, 55c, 55d, and 55e, and thus the evaporation efficiency of the refrigerant can be improved.

Figure 19:
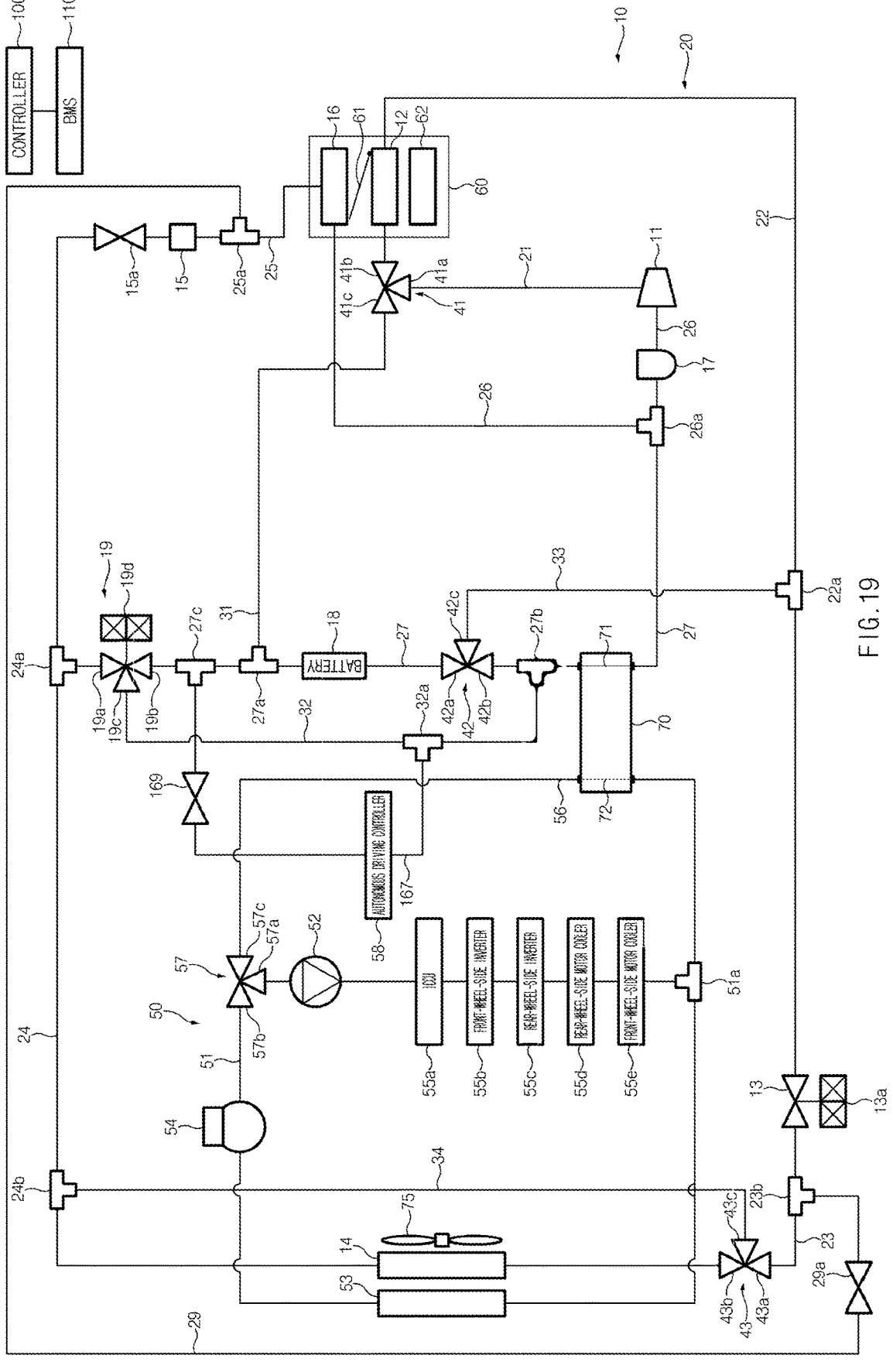
FIG. 19 illustrates an example of the vehicular thermal management system illustrated in FIG. 1.

FIG. 19 illustrates a modification of the vehicular thermal management system illustrated in FIG. 1.

Referring to FIG. 19, the HVAC subsystem 10 can further include a second distribution line 167 configured to allow the refrigerant discharged from the outlet port 19b of the battery-side expansion valve 19 to be directed from an upstream point 27c of the battery 18 to the first passage 71 of the heat exchanger 70 through the upstream bypass line 32. An inlet of the second distribution line 167 can be connected to the distribution line 27 at the upstream point 27c of the battery 18, and the inlet of the second distribution line 167 can be located on the upstream side of the upstream point 27a of the battery 18 to which the outlet of the warm-up line 31 is connected. An outlet of the second distribution line 167 can be connected to the point 32a of the upstream bypass line 32. Accordingly, at least a portion of the refrigerant discharged from the outlet port 19b of the battery-side expansion valve 19 can be directed to the first passage 71 of the heat exchanger 70 through the second distribution line 167 and the upstream bypass line 32.

The autonomous driving controller 58 and a shut-off valve 169 can be disposed on the second distribution line 167, and the shut-off valve 169 can be disposed on the upstream side of the autonomous driving controller 58. The autonomous driving controller 58 can have a refrigerant passage provided inside or outside thereof, and the refrigerant passage of the autonomous driving controller 58 can be fluidly connected to the second distribution line 167. In some implementations, the shut-off valve 169 can be a solenoid valve, and the controller 100 can control the operation of the shut-off valve 169.

In a state in which the inlet port 19a of the battery-side expansion valve 19 is opened, the outlet port 19b of the battery-side expansion valve 19 is opened to a predetermined degree, and the shut-off valve 169 of the second distribution line 167 is opened, at least a portion of the refrigerant discharged from the exterior heat exchanger 14 can be expanded at the outlet port 19b of the battery-side expansion valve 19, and the expanded refrigerant can be directed to the refrigerant passage of the autonomous driving controller 58 through the second distribution line 167 so that the refrigerant can be evaporated in the refrigerant passage of the autonomous driving controller 58. Accordingly, the autonomous driving controller 58 can be directly cooled by the evaporation of the refrigerant.

The autonomous driving controller 58 can have a higher heat generating amount than the other power electronic components 55a, 55b, 55c, 55d, and 55e, and the refrigerant can directly cool the autonomous driving controller 58 through the second distribution line 167 and the shut-off valve 169 so that the cooling of the autonomous driving controller 58 can be improved.

In addition, the autonomous driving controller 58 can be located on the upstream side of the first passage 71 of the heat exchanger 70 through the second distribution line 167 in the refrigerant flow direction so that the refrigerant evaporated in the autonomous driving controller 58 can absorb the waste heat of the power electronic components 55a, 55b, 55c, 55d, and 55e, and thus the evaporation efficiency of the refrigerant can be improved.

Figure 20:
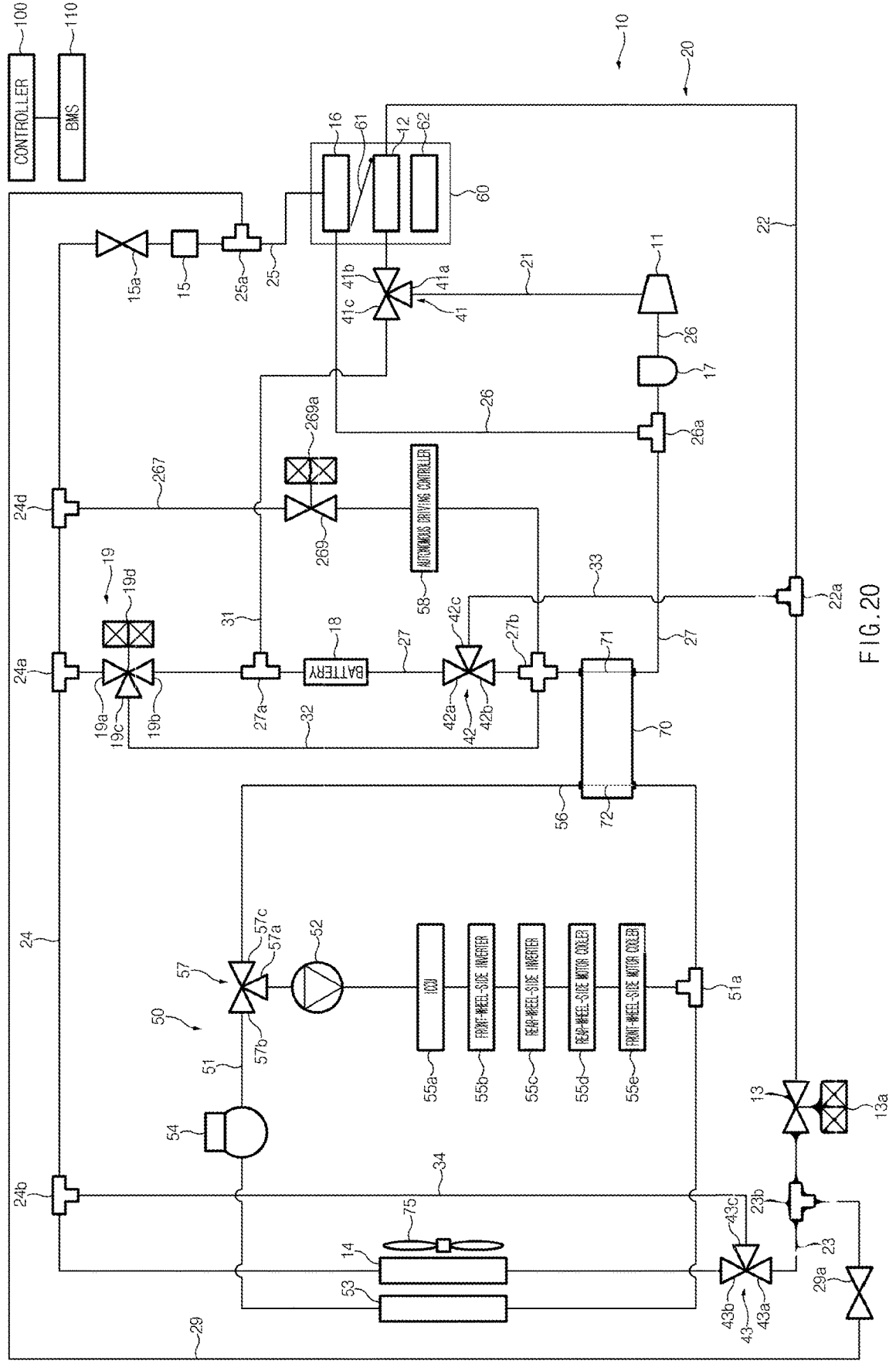
FIG. 20 illustrates an example of the vehicular thermal management system illustrated in FIG. 1.

FIG. 20 illustrates a modification of the vehicular thermal management system illustrated in FIG. 1.

Referring to FIG. 20, the HVAC subsystem 10 can further include a second distribution line 267 configured to allow the refrigerant discharged from the exterior heat exchanger 14 to be directed from the upstream side of the cooling-side expansion valve 15 to the first passage 71 of the heat exchanger 70. An inlet of the second distribution line 267 can be connected to the fourth line 24 of the refrigerant circulation path 20 at an upstream point 24d of the cooling-side expansion valve 15, and the upstream point 24d to which the inlet of the second distribution line 267 is connected can be located on the downstream side of the upstream point 24a to which the inlet of the distribution line 27 is connected. An outlet of the second distribution line 267 can be connected to the distribution line 27 at the downstream point 27b of the battery 18 located on the upstream side of the first passage 71 of the heat exchanger 70, and the outlet of the second distribution line 267 and the outlet of the upstream bypass line 32 can be joined at the downstream point 27b of the battery 18 located on the upstream side of the first passage 71 of the heat exchanger 70. Accordingly, at least a portion of the refrigerant can be directed to the first passage 71 of the heat exchanger 70 through the second distribution line 267.

The autonomous driving controller 58 and an expansion valve 269 can be disposed on the second distribution line 267, and the expansion valve 269 can be disposed on the upstream side of the autonomous driving controller 58. The autonomous driving controller 58 can have a refrigerant passage provided inside or outside thereof, and the refrigerant passage of the autonomous driving controller 58 can be fluidly connected to the second distribution line 267. The expansion valve 269 can be configured to adjust the flow of the refrigerant and/or the flow rate of the refrigerant into the refrigerant passage of the autonomous driving controller 58, and to expand the refrigerant received from the exterior heat exchanger 14. In some implementations, the expansion valve 269 can be an EXV having an actuator 269a. The actuator 269a can have a shaft which is movable to open or close an orifice defined in a valve body of the expansion valve 269, and the position of the shaft can be varied depending on the rotation direction, rotation degree, and the like of the actuator 269a, and accordingly the opening degree of the orifice of the expansion valve 269 can be varied. The controller 100 can control the operation of the actuator 269a. As the expansion valve 269 is opened to a predetermined degree, at least a portion of the refrigerant discharged from the exterior heat exchanger 14 can be expanded by the expansion valve 269, and the expanded refrigerant can pass through the refrigerant passage of the autonomous driving controller 58 so that the refrigerant can be evaporated in the refrigerant passage of the autonomous driving controller 58. Accordingly, the autonomous driving controller 58 can be directly cooled by the evaporation of the refrigerant.

The autonomous driving controller 58 can have a higher heat generating amount than the other power electronic components 55a, 55b, 55c, 55d, and 55e, and the refrigerant can directly cool the autonomous driving controller 58 through the second distribution line 267 and the expansion valve 269 so that the cooling of the autonomous driving controller 58 can be improved.

In addition, the autonomous driving controller 58 can be located on the upstream side of the first passage 71 of the heat exchanger 70 through the second distribution line 267 in the refrigerant flow direction so that the refrigerant evaporated in the autonomous driving controller 58 can absorb the waste heat of the power electronic components 55a, 55b, 55c, 55d, and 55e, and thus the evaporation efficiency of the refrigerant can be improved.

Figure 21:
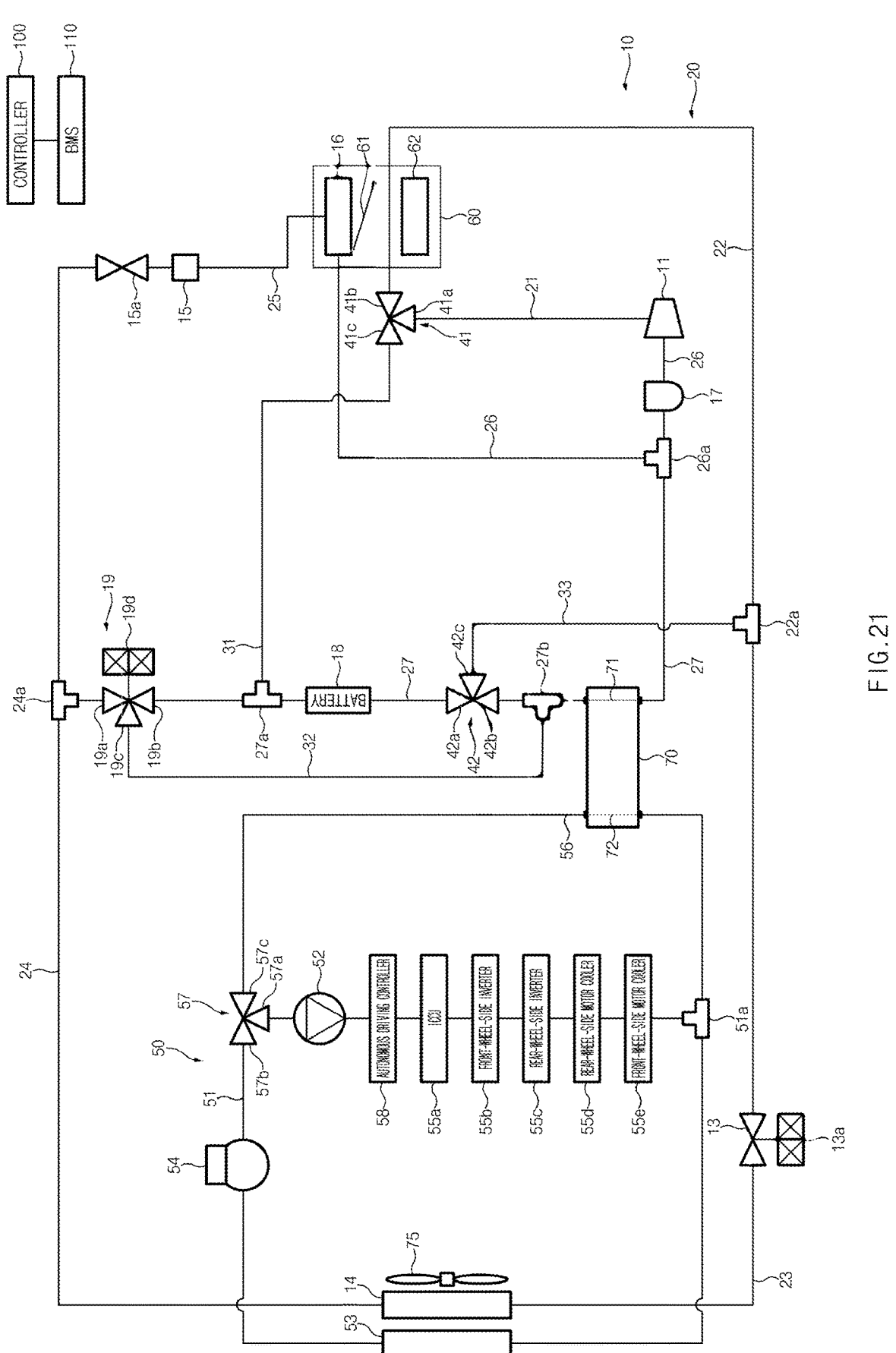
FIG. 21 illustrates an example of a configuration of a vehicular thermal management system.

FIG. 21 illustrates an example configuration of a vehicular thermal management system.

Referring to FIG. 21, the HVAC subsystem 10 can include the compressor 11, the heating-side expansion valve 13, the exterior heat exchanger 14, the cooling-side expansion valve 15, and the evaporator 16 fluidly connected through the refrigerant circulation path 20. That is, in some implementations, the interior condenser 12 can be removed, and the refrigerant discharged from the compressor 11 can be directed into the heating-side expansion valve 13. As the interior condenser 12 is removed, the first outlet port 41b of the first control valve 41 can be configured to communicate with the heating-side expansion valve 13, and accordingly the first control valve 41 can be configured to control the flow of the refrigerant in a manner that allows the refrigerant discharged from the compressor 11 to selectively be directed toward the refrigerant passage of the battery 18 and/or the heating-side expansion valve 13. In addition, in some implementations, the dehumidification bypass line 29, the heat exchanger bypass line 34, and the third control valve 43 can be removed. As the plurality of elements are removed, the manufacturing cost of the HVAC subsystem 10 the implementation illustrated in FIG. 21 can be reduced. The other elements of the HVAC subsystem 10 according to the exemplary implementation illustrated in FIG. 21 can be the same as or similar to those according to the exemplary implementation illustrated in FIG. 1.

Figure 22:
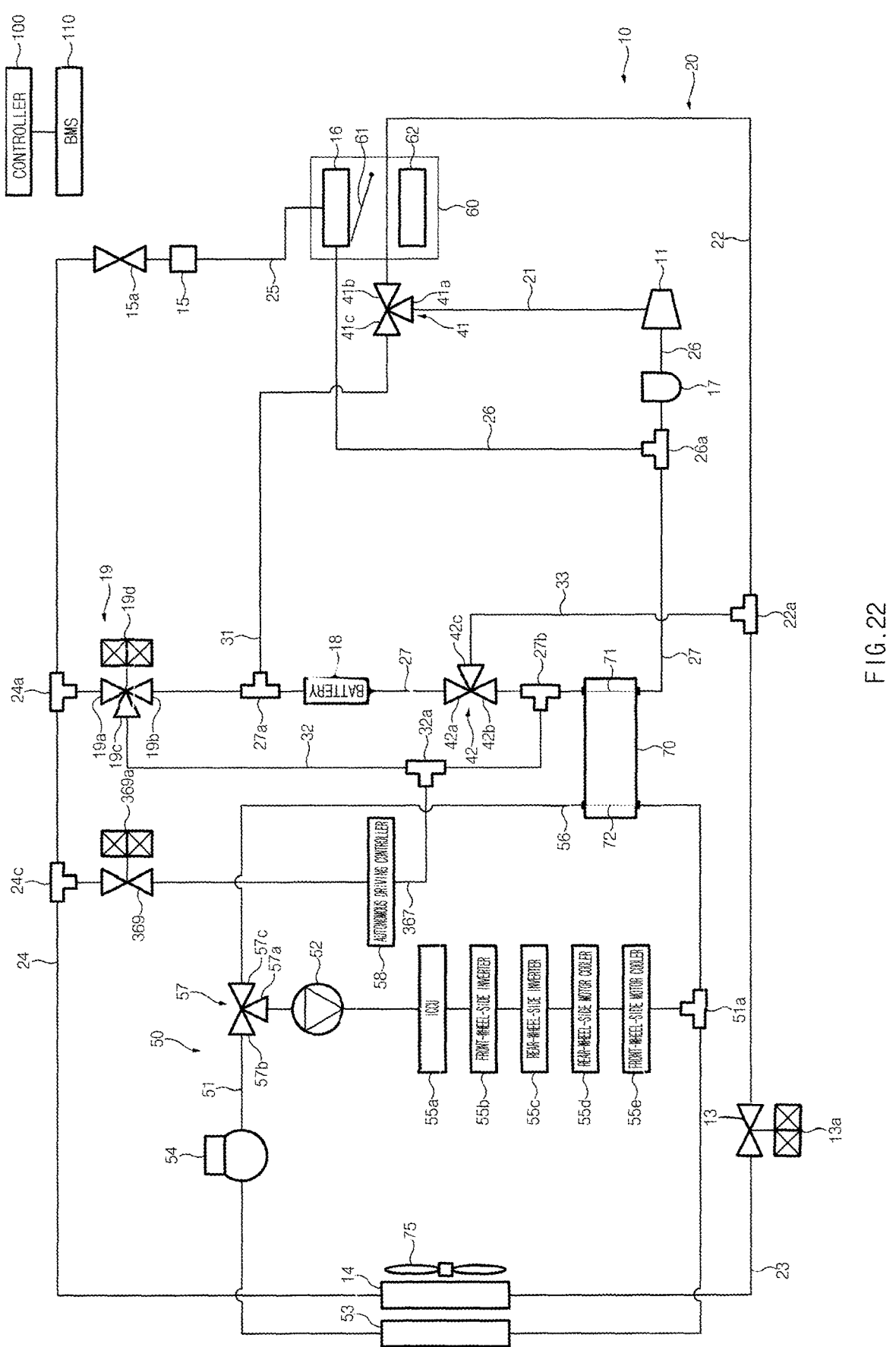
FIG. 22 illustrates an example of the vehicular thermal management system illustrated in FIG. 21.

FIG. 22 illustrates a modification of the vehicular thermal management system illustrated in FIG. 21.

Referring to FIG. 22, the HVAC subsystem 10 can further include a second distribution line 367 configured to allow the refrigerant discharged from the exterior heat exchanger 14 to be directed from the upstream point 24c of the cooling-side expansion valve 15 to the first passage 71 of the heat exchanger 70 through the upstream bypass line 32. An inlet of the second distribution line 367 can be connected to the fourth line 24 of the refrigerant circulation path 20 at the upstream point 24c of the cooling-side expansion valve 15, and the inlet of the second distribution line 367 can be located on the upstream side of the inlet of the distribution line 27. An outlet of the second distribution line 367 can be connected to the point 32a of the upstream bypass line 32. Accordingly, at least a portion of the refrigerant discharged from the exterior heat exchanger 14 can be directed to the first passage 71 of the heat exchanger 70 through the second distribution line 367 and the upstream bypass line 32.

The autonomous driving controller 58 and an expansion valve 369 can be disposed on the second distribution line 367, and the expansion valve 369 can be disposed on the upstream side of the autonomous driving controller 58. The autonomous driving controller 58 can have a refrigerant passage provided inside or outside thereof, and the refrigerant passage of the autonomous driving controller 58 can be fluidly connected to the second distribution line 367. The expansion valve 369 can be configured to adjust the flow of the refrigerant and/or the flow rate of the refrigerant into the refrigerant passage of the autonomous driving controller 58, and to expand the refrigerant received from the exterior heat exchanger 14.

In some implementations, the expansion valve 369 can be an EXV having an actuator 369a. The actuator 369a can have a shaft which is movable to open or close an orifice defined in a valve body of the expansion valve 369, and the position of the shaft can be varied depending on the rotation direction, rotation degree, and the like of the actuator 369a, and accordingly the opening degree of the orifice of the expansion valve 369 can be varied. The controller 100 can control the operation of the actuator 369a. As the expansion valve 369 is opened to a predetermined degree, at least a portion of the refrigerant discharged from the exterior heat exchanger 14 can be expanded by the expansion valve 369, and the expanded refrigerant can pass through the refrigerant passage of the autonomous driving controller 58 so that the refrigerant can be evaporated in the refrigerant passage of the autonomous driving controller 58. Accordingly, the autonomous driving controller 58 can be directly cooled by the evaporation of the refrigerant.

The autonomous driving controller 58 can have a higher heat generating amount than the other power electronic components 55a, 55b, 55c, 55d, and 55e, and the refrigerant can directly cool the autonomous driving controller 58 through the second distribution line 367 and the expansion valve 369 so that the cooling of the autonomous driving controller 58 can be improved.

In addition, the autonomous driving controller 58 can be located on the upstream side of the first passage 71 of the heat exchanger 70 through the second distribution line 367 in the refrigerant flow direction so that the refrigerant evaporated in the autonomous driving controller 58 can absorb the waste heat of the power electronic components 55a, 55b, 55c, 55d, and 55e, and thus the evaporation efficiency of the refrigerant can be improved.

Figure 23:
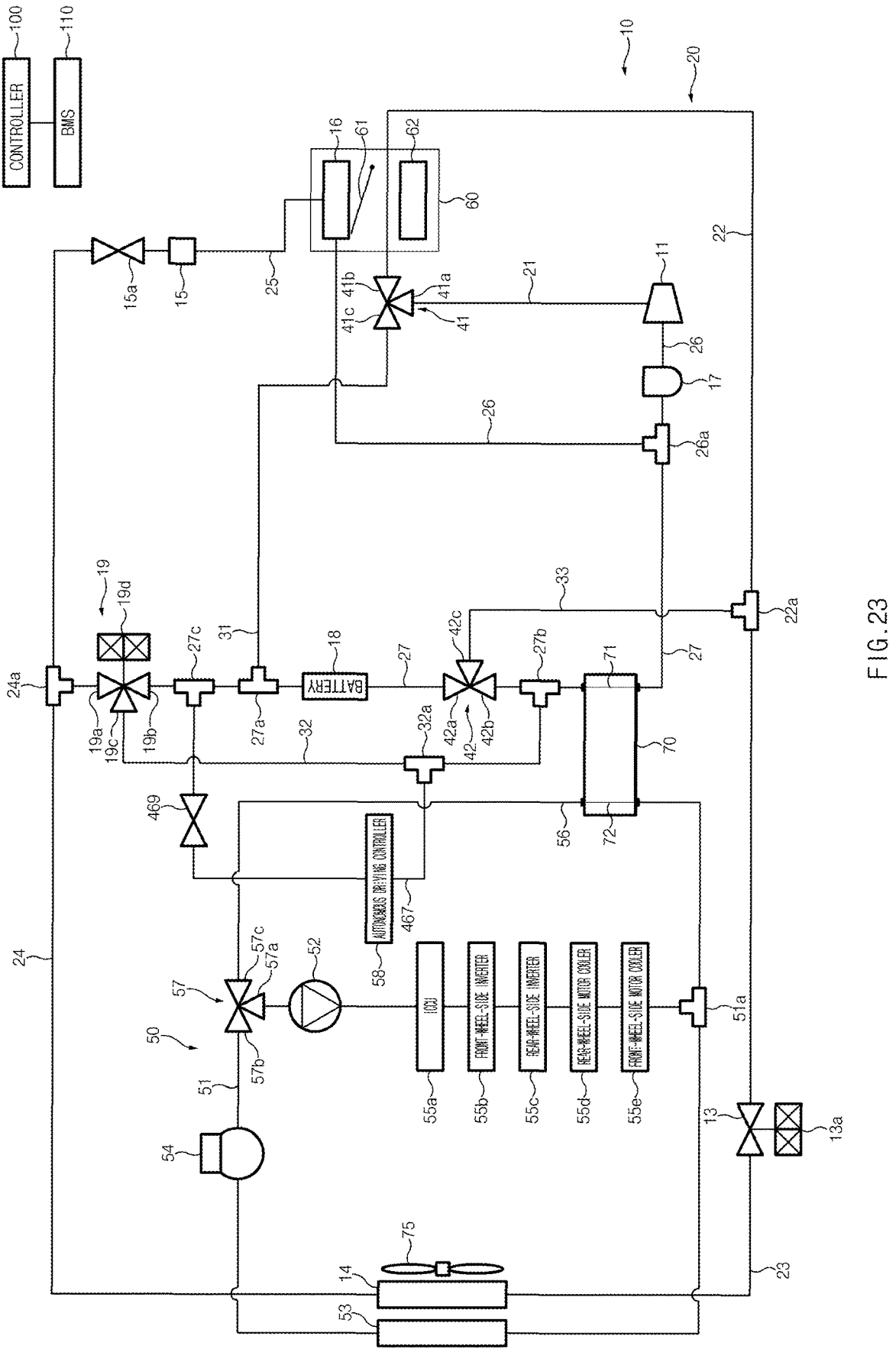
FIG. 23 illustrates an example of the vehicular thermal management system illustrated in FIG. 21.

FIG. 23 illustrates a modification of the vehicular thermal management system illustrated in FIG. 22.

Referring to FIG. 23, the HVAC subsystem 10 can further include a second distribution line 467 configured to allow the refrigerant discharged from the outlet port 19b of the battery-side expansion valve 19 to be directed from the upstream point 27c of the battery 18 to the first passage 71 of the heat exchanger 70 through the upstream bypass line 32. An inlet of the second distribution line 467 can be connected to the distribution line 27 at the upstream point 27c of the battery 18, and the inlet of the second distribution line 467 can be located on the upstream side of the outlet of the warm-up line 31. An outlet of the second distribution line 467 can be connected to the point 32a of the upstream bypass line 32. Accordingly, at least a portion of the refrigerant discharged from the outlet port 19b of the battery-side expansion valve 19 can be directed to the first passage 71 of the heat exchanger 70 through the second distribution line 467 and the upstream bypass line 32.

The autonomous driving controller 58 and a shut-off valve 469 can be disposed on the second distribution line 467, and the shut-off valve 469 can be disposed on the upstream side of the autonomous driving controller 58. The autonomous driving controller 58 can have a refrigerant passage provided inside or outside thereof, and the refrigerant passage of the autonomous driving controller 58 can be fluidly connected to the second distribution line 467. In some implementations, the shut-off valve 469 can be a solenoid valve, and the controller 100 can control the operation of the shut-off valve 469.

In a state in which the inlet port 19a of the battery-side expansion valve 19 is opened, the outlet port 19b of the battery-side expansion valve 19 is opened to a predetermined degree, and the shut-off valve 469 of the second distribution line 467 is opened, at least a portion of the refrigerant discharged from the exterior heat exchanger 14 can be expanded at the outlet port 19b of the battery-side expansion valve 19, and the expanded refrigerant can pass through the refrigerant passage of the autonomous driving controller 58 through the second distribution line 467 so that the refrigerant can be evaporated in the refrigerant passage of the autonomous driving controller 58. Accordingly, the autonomous driving controller 58 can be directly cooled by the evaporation of the refrigerant.

The autonomous driving controller 58 can have a higher heat generating amount than the other power electronic components 55a, 55b, 55c, 55d, and 55e, and the refrigerant can directly cool the autonomous driving controller 58 through the second distribution line 467 and the shut-off valve 469 so that the cooling of the autonomous driving controller 58 can be improved.

In addition, the autonomous driving controller 58 can be located on the upstream side of the first passage 71 of the heat exchanger 70 through the second distribution line 467 in the refrigerant flow direction so that the refrigerant evaporated in the autonomous driving controller 58 can absorb the waste heat of the power electronic components 55a, 55b, 55c, 55d, and 55e, and thus the evaporation efficiency of the refrigerant can be improved.

Figure 24:
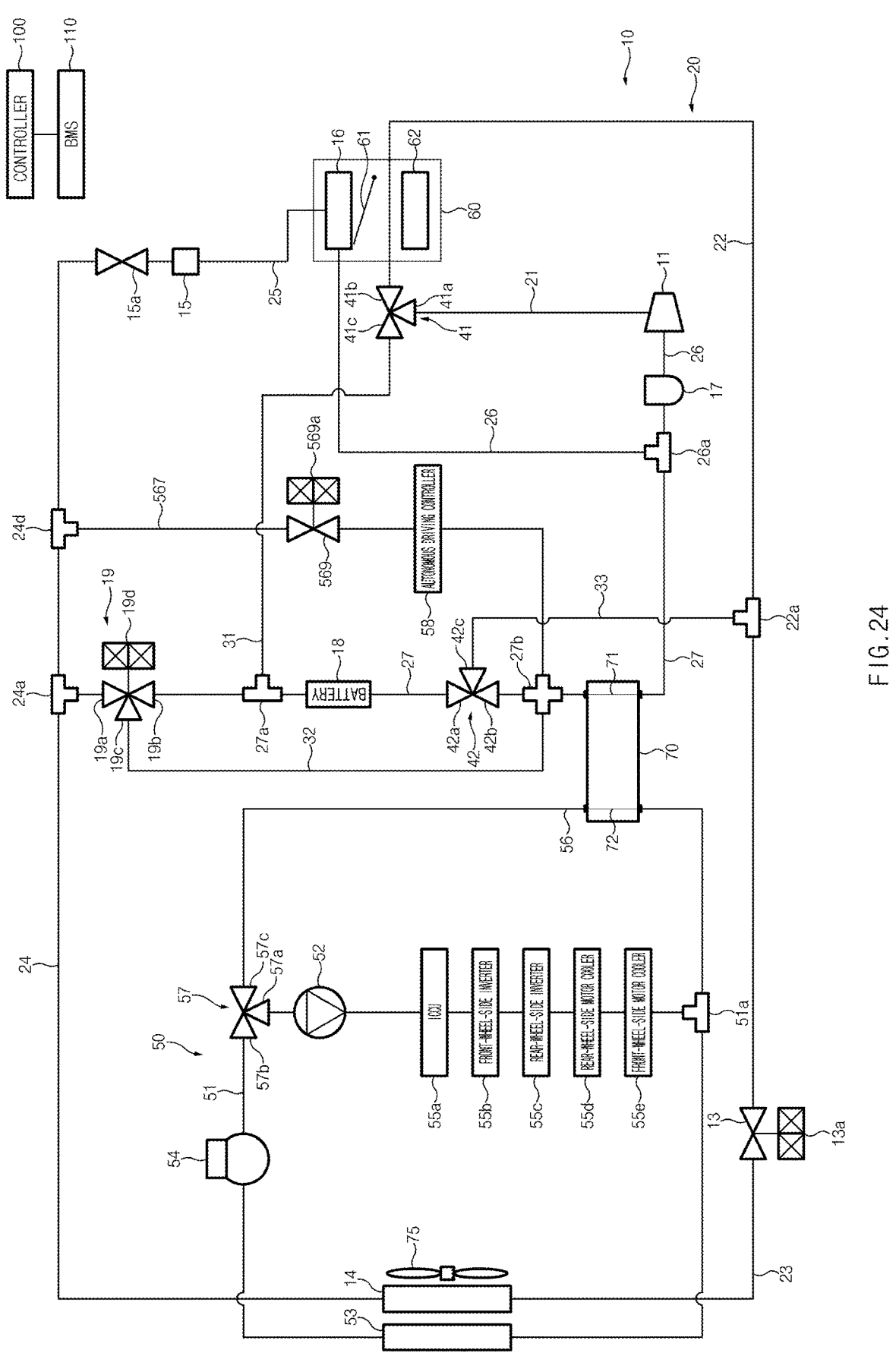
FIG. 24 illustrates an example of the vehicular thermal management system illustrated in FIG. 21.

FIG. 24 illustrates a modification of the vehicular thermal management system illustrated in FIG. 21.

Referring to FIG. 24, the HVAC subsystem 10 can further include a second distribution line 567 configured to allow the refrigerant discharged from the exterior heat exchanger 14 to be directed from the upstream side of the cooling-side expansion valve 15 to the first passage 71 of the heat exchanger 70. An inlet of the second distribution line 567 can be connected to the fourth line 24 of the refrigerant circulation path 20 at the upstream point 24d of the cooling-side expansion valve 15, and the upstream point 24d to which the inlet of the second distribution line 567 is connected can be located on the downstream side of the upstream point 24a to which the inlet of the distribution line 27 is connected. An outlet of the second distribution line 567 can be connected to the distribution line 27 at the downstream point 27b of the battery 18 located on the upstream side of the first passage 71 of the heat exchanger 70, and the outlet of the second distribution line 567 and the outlet of the upstream bypass line 32 can be joined at the downstream point 27b of the battery 18 located on the upstream side of the first passage 71 of the heat exchanger 70. Accordingly, at least a portion of the refrigerant can be directed to the first passage 71 of the heat exchanger 70 through the second distribution line 567.

The autonomous driving controller 58 and an expansion valve 569 can be disposed on the second distribution line 567, and the expansion valve 569 can be disposed on the upstream side of the autonomous driving controller 58. The autonomous driving controller 58 can have a refrigerant passage provided inside or outside thereof, and the refrigerant passage of the autonomous driving controller 58 can be fluidly connected to the second distribution line 567. The expansion valve 569 can be configured to adjust the flow of the refrigerant and/or the flow rate of the refrigerant into the refrigerant passage of the autonomous driving controller 58, and to expand the refrigerant received from the exterior heat exchanger 14.

In some implementations, the expansion valve 569 can be an EXV having an actuator 569a. The actuator 569a can have a shaft which is movable to open or close an orifice defined in a valve body of the expansion valve 569, and the position of the shaft can be varied depending on the rotation direction, rotation degree, and the like of the actuator 569a, and accordingly the opening degree of the orifice of the expansion valve 569 can be varied. The controller 100 can control the operation of the actuator 569a. As the expansion valve 569 is opened to a predetermined degree, at least a portion of the refrigerant discharged from the exterior heat exchanger 14 can be expanded by the expansion valve 569, and the expanded refrigerant can pass through the refrigerant passage of the autonomous driving controller 58 so that the refrigerant can be evaporated in the refrigerant passage of the autonomous driving controller 58. Accordingly, the autonomous driving controller 58 can be directly cooled by the evaporation of the refrigerant.

The autonomous driving controller 58 can have a higher heat generating amount than the other power electronic components 55a, 55b, 55c, 55d, and 55e, and the refrigerant can directly cool the autonomous driving controller 58 through the second distribution line 567 and the expansion valve 569 so that the cooling of the autonomous driving controller 58 can be improved.

In addition, the autonomous driving controller 58 can be located on the upstream side of the first passage 71 of the heat exchanger 70 through the second distribution line 567 in the refrigerant flow direction so that the refrigerant evaporated in the autonomous driving controller 58 can absorb the waste heat of the power electronic components 55a, 55b, 55c, 55d, and 55e, and thus the evaporation efficiency of the refrigerant can be improved.

As set forth above, the vehicular thermal management system can include the HVAC subsystem designed to allow the refrigerant circulating therein to cool the battery or increase the temperature of the battery to thereby maintain the temperature of the battery at an optimal operating temperature, and remove a conventional battery b cooling subsystem (a battery coolant circulation path, a battery pump, a valve, etc.) for cooling and temperature rising of the battery, so the weight and manufacturing cost thereof can be reduced. In particular, as the refrigerant is used to cool the battery, the battery cooling performance can be improved.

In some implementations, the high temperature refrigerant discharged from the compressor can be used to increase the temperature of the battery, so a separate heater for the temperature rising of the battery can be removed.

In some implementations, the refrigerant can exchange heat with the power electronics coolant through the heat exchanger, and the refrigerant can exchange heat with the ambient air through the exterior heat exchanger so that the refrigerant can maintain the temperature of the battery constantly, and the performance (the heating of the passenger compartment) of the HVAC subsystem can be improved.

Hereinabove, although the present disclosure has been described with reference to exemplary implementations and the accompanying drawings, the present disclosure is not limited thereto, but can be variously modified and altered by those skilled in the art to which the present disclosure pertains without departing from the spirit and scope of the present disclosure claimed in the following claims.

What is claimed is:

1. A vehicular thermal management system, comprising:
   a heating, ventilation, and air conditioning (HVAC) subsystem comprising:
      a compressor,
      a heating-side expansion valve disposed at a downstream side of the compressor,
      an exterior heat exchanger disposed at a downstream side of the heating-side expansion valve,
      a cooling-side expansion valve disposed at a downstream side of the exterior heat exchanger,
      an evaporator disposed at a downstream side of the cooling-side expansion valve,
      a distribution line configured to guide at least a portion of a refrigerant discharged from the exterior heat exchanger in a direction from an upstream side of the cooling-side expansion valve to the compressor, and
      a battery disposed at the distribution line;
   a power electronics cooling subsystem comprising:
      a power electronic component,
      a power electronic radiator,
      a power electronic pump disposed between the power electronic component and the power electronic radiator, and
      a bypass line configured to allow at least a portion of a power electronics coolant discharged from the power electronic component to bypass the power electronic radiator; and
   a heat exchanger comprising (i) a first passage fluidly connected to the distribution line and (ii) a second passage fluidly connected to the bypass line,
   wherein the first passage of the heat exchanger is fluidly connected to the distribution line and disposed at a downstream side of the battery.

2. The vehicular thermal management system according to claim 1, wherein the second passage of the heat exchanger is fluidly connected to the bypass line and disposed at a downstream side of the power electronic component.

3. The vehicular thermal management system according to claim 1, wherein the HVAC subsystem further comprises a battery-side expansion valve disposed at an upstream side of the battery in the distribution line.

4. The vehicular thermal management system according to claim 3, wherein the battery-side expansion valve comprises (i) an inlet port configured to fluidly communicate with the exterior heat exchanger and (ii) an outlet port configured to fluidly communicate with the battery.

5. The vehicular thermal management system according to claim 4, wherein the HVAC subsystem further comprises an upstream bypass line configured to guide the refrigerant from the upstream side of the battery to the downstream side of the battery.

6. The vehicular thermal management system according to claim 5, wherein the battery-side expansion valve further comprises a bypass port configured to fluidly communicate with the upstream bypass line.

7. The vehicular thermal management system according to claim 5, wherein an outlet of the upstream bypass line is connected to the distribution line at an upstream point of the first passage of the heat exchanger.

8. The vehicular thermal management system according to claim 1, wherein the HVAC subsystem further comprises a warm-up line configured to guide the refrigerant from the downstream side of the compressor to the battery.

9. The vehicular thermal management system according to claim 1, wherein the HVAC subsystem further comprises an interior condenser disposed between the compressor and the heating-side expansion valve.

10. The vehicular thermal management system according to claim 9, the HVAC subsystem further comprises a first control valve configured to allow the refrigerant discharged from the compressor to be directed toward at least one of the interior condenser or the battery.

11. The vehicular thermal management system according to claim 1, wherein the HVAC subsystem further comprises a downstream bypass line configured to guide the refrigerant discharged from the battery to the heating-side expansion valve.

12. The vehicular thermal management system according to claim 1, wherein the HVAC subsystem further comprises a second control valve configured to allow the refrigerant discharged from the battery to be directed toward at least one of the first passage of the heat exchanger or the heating-side expansion valve.

13. The vehicular thermal management system according to claim 1, wherein the HVAC subsystem further comprises a heat exchanger bypass line configured to guide at least a portion of the refrigerant discharged from the heating-side expansion valve in a direction from an upstream side of the exterior heat exchanger to the downstream side of the exterior heat exchanger.

14. The vehicular thermal management system according to claim 13, wherein the HVAC subsystem further comprises a third control valve configured to allow at least a portion of the refrigerant discharged from the heating-side expansion valve to be directed toward at least one of the exterior heat exchanger or the heat exchanger bypass line.

15. The vehicular thermal management system according to claim 1, wherein the HVAC subsystem further comprises a dehumidification bypass line configured to guide at least a portion of the refrigerant discharged from the heating-side expansion valve in a direction from an upstream side of the exterior heat exchanger to the evaporator.

16. The vehicular thermal management system according to claim 15, wherein the HVAC subsystem further comprises a shut-off valve disposed at the dehumidification bypass line.

17. The vehicular thermal management system according to claim 1, wherein the HVAC subsystem further comprises a second distribution line configured to guide the refrigerant discharged from the exterior heat exchanger in a direction from the upstream side of the cooling-side expansion valve to the first passage of the heat exchanger.

18. The vehicular thermal management system according to claim 17, wherein the HVAC subsystem further comprises an autonomous driving controller disposed at the second distribution line.

19. The vehicular thermal management system according to claim 1, wherein the power electronics cooling subsystem further comprises a switching valve configured to allow the power electronics coolant discharged from the power electronic component to be directed toward at least one of the power electronic radiator or the bypass line.

* * * * *